United States Patent
Dragojevic et al.

(10) Patent No.: US 12,222,922 B2
(45) Date of Patent: Feb. 11, 2025

(54) VERSIONING OF ITEMS IN A DATA STRUCTURE

(71) Applicant: Microsoft Technology Licensing, LLC, Redmond, WA (US)

(72) Inventors: Aleksandar Dragojevic, Cambridge (GB); Junyi Liu, Cambridge (GB); Antonios Katsarakis, Cambridge (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/569,045

(22) PCT Filed: Jun. 10, 2022

(86) PCT No.: PCT/US2022/032923
§ 371 (c)(1),
(2) Date: Dec. 11, 2023

(87) PCT Pub. No.: WO2023/278122
PCT Pub. Date: Jan. 5, 2023

(65) Prior Publication Data
US 2024/0273080 A1    Aug. 15, 2024

(30) Foreign Application Priority Data
Jun. 28, 2021   (EP) .................................. 21181926

(51) Int. Cl.
*G06F 16/20*     (2019.01)
*G06F 16/22*     (2019.01)
*G06F 16/23*     (2019.01)

(52) U.S. Cl.
CPC ...... *G06F 16/2329* (2019.01); *G06F 16/2246* (2019.01)

(58) Field of Classification Search
CPC ............. G06F 16/2246; G06F 16/2308; G06F 16/2329
See application file for complete search history.

(56) References Cited

U.S. PATENT DOCUMENTS 7,082,438 B2 * 7/2006 Najork ................ G06F 16/9024
10,406,446 B2 * 9/2019 Amaitis .............. G07F 17/3237
(Continued)

FOREIGN PATENT DOCUMENTS

CN       104063446 A     9/2014
WO       2022251009 A1   12/2022

OTHER PUBLICATIONS

Avery, et al., "MongoDB revs you up: What storage engine is right for you? (Part 1)", accessed on link https://www.percona.com/blog/mongodb-revs-you-up-what-storage-engine-is-right-part-1/, Jan. 6, 2016, 10 pages.
Basin, et al., "KiWi: A Key-Value Map for Scalable Real-Time Analytics", ACM, 2017, 13 pages.
Extended European Search Report Issued in European Application No. 21181926.3, mailed on Dec. 22, 2021, 7 Pages.
(Continued)

*Primary Examiner* — Vincent F Boccio
(74) *Attorney, Agent, or Firm* — Barta Jones, PLLC

(57) ABSTRACT

A system comprising: memory storing a data structure comprising a plurality of items, each item comprising a key-value pair; a writer arranged to perform a plurality of write operations each to write a respective item, either a new item being added to the data structure or an existing item being modified in the data structure; and a reader configured to perform a group-read operation to read from the data structure any items having keys in a specified range. The writer is configured to maintain a global write version and the reader is configured to maintain a global read version.

15 Claims, 10 Drawing Sheets

(56) References Cited

U.S. PATENT DOCUMENTS

| | | | |
|---|---|---|---|
| 10,417,209 | B1 | 9/2019 | Deran |
| 10,572,452 | B1 | 2/2020 | Singh |
| 10,599,485 | B2 * | 3/2020 | Levandoski ............. G06F 9/52 |
| 2006/0026188 | A1 | 2/2006 | Najork |
| 2010/0306222 | A1 | 12/2010 | Freedman |
| 2010/0328115 | A1 | 12/2010 | Binnig |
| 2011/0252067 | A1 | 10/2011 | Marathe |
| 2016/0110403 | A1 | 4/2016 | Lomet |
| 2016/0335299 | A1 | 11/2016 | Vemulapati et al. |
| 2016/0357791 | A1 | 12/2016 | Levandoski et al. |
| 2018/0189342 | A1 | 7/2018 | Danilov |
| 2018/0373727 | A1 | 12/2018 | Ding et al. |
| 2019/0235933 | A1 * | 8/2019 | Levandoski ........ G06F 9/30043 |
| 2019/0294709 | A1 | 9/2019 | Gupta et al. |
| 2020/0050692 | A1 | 2/2020 | Antonopoulos |
| 2020/0257732 | A1 | 8/2020 | Oh |
| 2020/0293506 | A1 | 9/2020 | Gupta et al. |
| 2021/0303533 | A1 | 9/2021 | Legler |
| 2022/0027349 | A1 | 1/2022 | Shuo |
| 2022/0138095 | A1 | 5/2022 | Jain |
| 2024/0241873 | A1 | 7/2024 | Dragojevic |

OTHER PUBLICATIONS

Extended Search Report Issued in European Patent Application No. 211759212, Nov. 17, 2021, 11 Pages.
International Search Report and Written Opinion Issued in PCT Application No. PCT/US22/029722, mailed on Jul. 14, 2022, 14 pages.
International Search Report and Written Opinion received for PCT Application No. PCT/US22/032923 Sep. 28, 2022, 10 pages.
Isoda, et al., "POMVCC: Partial Order Multi-Version Concurrency Control", In International Journal on Advances in Software, vol. 11, Issue No. 3 & 4, May 20, 2018, pp. 452-465.
Nelson, et al., "Bundled References: An Abstraction for Highly-Concurrent Linearizable Range Queries", arXiv:2012.15438v1, Dec. 31, 2020, 14 pages.
Neumann., et al., "Fast Serializable Multi-Version Concurrency Control for Main-Memory Database Systems," SIGMOD '15, 2015, pp. 677-689.
Wu, et al., "An Empirical Evaluation of In-Memory Multi-Version Concurrency Control", In Proceedings of the VLDB Endowment, vol. 10, Issue No. 7, Mar. 1, 2017, pp. 781-792.
Office Action Received for European Application No. 22728329.8, mailed on Jan. 9, 2024, 3 pages.
Non-Final Office Action mailed on Nov. 29, 2024, in U.S. Appl. No. 18/563,627, 30 pages.

* cited by examiner

Inclusive scan for [14,22]

Covering scan for [14,22]

Covering scan for (14,22)

Figure 7
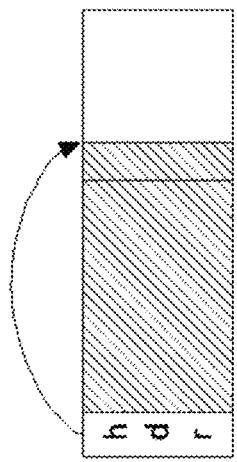
c) The size of the data in the node is changed to include the new item
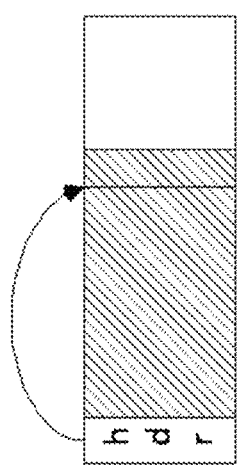
b) The item is copied into the small block. It is not visible to the readers
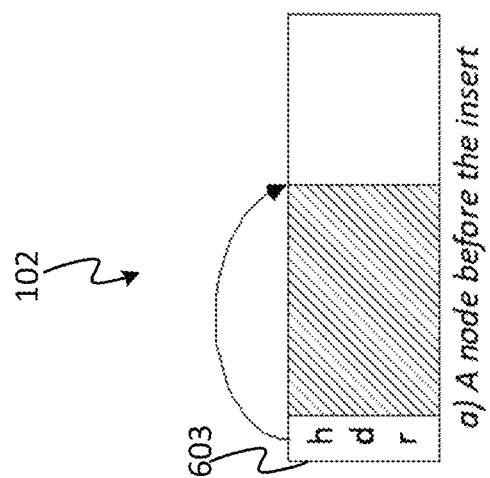
a) A node before the insert

Figure 13
a)
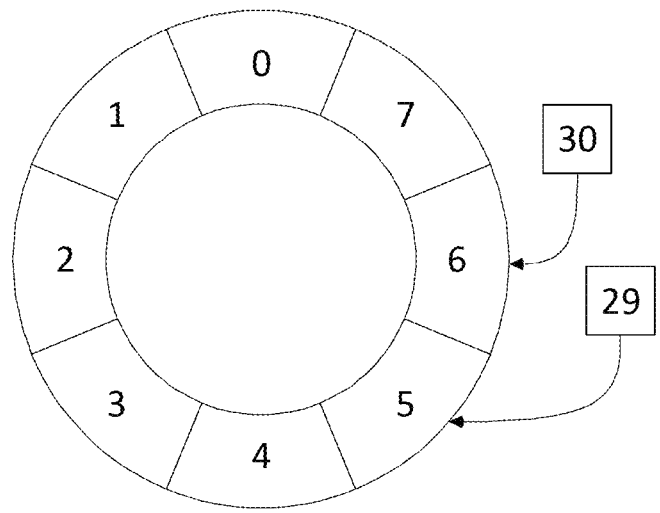
b)
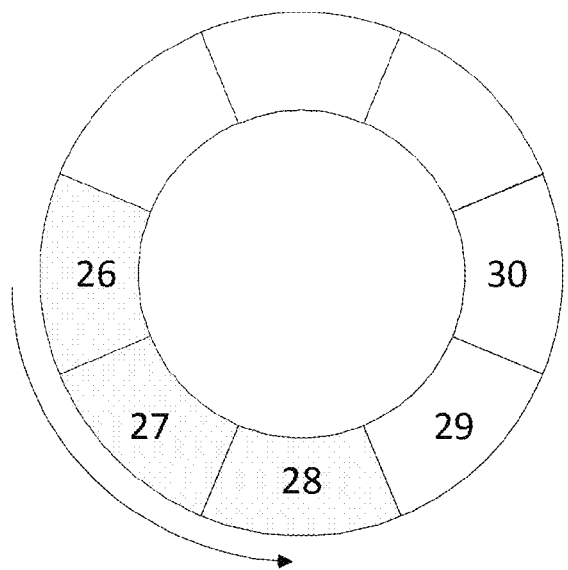

VERSIONING OF ITEMS IN A DATA STRUCTURE

BACKGROUND

A tree structure such as a B-tree can be used as an index data structure for storing key-value pairs (each pair comprising a value, which is the content being stored, and a key, which is used to index the value). Each leaf node of the tree contains a plurality of items, which are the key-value pairs. Further up the tree from the leaves, each internal node of the tree contains an indication of a range of key values encompassed by each of its children (which could be leaves or other interior nodes). When a new item is to be added to the tree, the writer uses the tree structure to determine which leaf contains the range of keys into which the key of the new item falls. If this leaf is not full, the new item can just be added to the existing leaf. However, if the leaf is full (leaves and internal nodes typically have a maximum size in bytes) then the leaf will be split. I.e. a new leaf is created. This also means updating the parent node of the old and new leaves so as to properly reference the key ranges of the two leaves. If that update to the parent would also take the parent beyond its maximum size, then that parent itself is split and the references of the grandparent are updated, and so forth. If items are deleted this could also involve merging leaves or internal nodes.

There are a number of operations that a writer or a reader may be required to perform in a given application. A reader may read an individual item with a specific key, or may perform a range scan to read from a range of keys. A writer may write a new entry, modify an existing entry, or delete an entry. A write herein may also be referred to as a form of update, in the sense that it updates the tree (not necessarily an existing item). A write could either be to write a new item to the tree, or to modify an existing item in the tree. Other forms of update to the tree more generally include splitting nodes and merging nodes.

Index data structures are used in a wide range of software systems, e.g. data stores and databases, file systems, operating systems, etc. An index data structure stores key-value pairs and it supports lookups, scans, inserts, and deletes of key-value pairs, among other operations. B-trees are one such index data structure. B-tree is an in-order index, meaning that it also supports scan operations. A scan operation returns all key-value pairs stored in the tree with keys in a specified range.

SUMMARY

There is a potential issue that can occur with a concurrent reader and writer, if the reader attempts to read a group of items from a part of the tree while the writer is writing to the same part of tree ("concurrent" for the present purposes just means overlapping in time).

For instance, consider a scenario where the reader is performing a range scan while data is also being written within the scanned range. Imagine for example that two writes are to be performed to a given leaf: a new or modified item with key 30, and a new or modified item with key 90 (in practice the keys may be much larger than this, but this is just for illustration). The writes are performed in that order, and will take a finite amount of time. Now imagine that the reader also performs a scan of the items with keys 1-100 around the same time. The scan is performed in that order, also takes a finite amount of time. Because of the direction of the scan (upwards from 1 to 100), it could be that the reader picks up the write of the later item with key 90, but not the earlier item with key 30, despite the fact that the write of the item with key 30 might complete earlier. E.g. say that the write of both items starts after the beginning of the range scan, but the write of the item with key 30 does not complete until after the scan has passed key 30, whereas the write of the item with key 90 has completed by the time the scan reaches key 90 (note also that different write operations do not necessarily take the same length of time as one another to complete, e.g. due to varying availability of CPU resources). In this scenario the scan would capture the newly written value of the item with key 90, but not that of the item with key 30, despite the fact that the write of the item with key 90 started later. Or as another example, say that the write of the item with key 30 begins before the start of the scan, but does not complete until after the scan has passed key 30. If the scan was to simply pass over items that were in the process of being written (e.g. because they were locked by the writer), then again the scan may capture the write of the item with key 90 but not 30.

It would be desirable if a snapshot of a part of the tree captured by the reader was always consistent with the order in which items were written to that part of the tree. Similar issues could also arise in other forms of data structure for storing key-value pairs, not just tree structures.

The consistency requirement is sometimes expressed in terms of "linearizability". A set of operations may be said to be linearizable if their effects occur as if each operation was performed in an instant in time (as opposed to spanning a finite time). This instant must be between the time when the operation was issued and the time when its result was received.

A simple solution would just be to have each operation lock the entire tree. This is not good for performance, but guarantees strong consistency.

More sophisticated systems may employ multi-version concurrency control (MVCC). In conventional MVCC systems, this consistency is achieved by using versioning and having each writer place a lock on the memory locations of the items being written. The tree has a single global version number, and each item is assigned an individual version number. When a write operation is to write an item, it places a lock on the memory location of the item to be written by setting its individual version number to an invalid value. The write operation then writes the item in question, and then acquires a read version number by reading the global version number, and then increment it. It then releases the lock by setting the item's version number to the global version number that was read earlier in the same write operation (from before the increment). At the start of a read operation (e.g. range scan), the reader reads the global version number, and then begins searching for items within the specified range of keys. In doing so it will read any unlocked item with a version number less than or equal to the global version number that it read at the start of the read operation. If the read operation encounters a locked item in the scanned range, it must wait for the lock on that item to be released before it can complete. Whether an item is visible depends on version numbers. The write operation takes the write version at the end of its execution, so even if it starts before the read, it might take the write version after the reader takes its read version. If a write operation within the scanned range acquires its write version before the start of the read operation, then that item will be read by the read operation because the item has a lower version number than that read by the reader at the start of the read operation If both writes begin but are not complete by the start of the range scan, then the reader must wait on both locks before it can complete the range scan. If on the other hand the write of the item with key 30 begins but is not complete before the start of the range scan, and the write of the item with key 90 starts after the start of the range scan, then the scan will capture the write of the item with key 30 but not 90, because the item with key 90 has a version number higher than that read by the reader at the beginning of the scan operation (though the scan still has to wait for both locks to be released to discover this). This is because the write increments the version at the end of its execution. If the write of both items begins after the start of the range scan, but still during the scan, then this scan will also be able to see the update to key 30 but not that to key 90, because the write to key 30 will be set with the same version as captured by the scan operation (though the scan still has to wait for both locks to be released to discover this). So the scan may not capture all the writes, but there is no scenario where it will capture the later write to key 90 without capturing the earlier write to key 30.

However, this conventional scheme requires the reader to wait for locks to be released before it can complete its read. It would be desirable to provide a versioning scheme which addresses the consistency issue without subjecting the reader to waiting on locks.

According to one aspect disclosed herein there is provided a system comprising: memory, a writer and a reader. The memory stores a data structure comprising a plurality of items, each item comprising a key-value pair. The writer is arranged to perform a plurality of write operations each to write a respective item, either a new item being added to the data structure or an existing item being modified in the data structure. The reader is configured to perform a group-read operation to read from the data structure any items having keys in a specified range. The writer is configured to maintain a global write version and the reader is configured to maintain a global read version. The writer is configured to perform each of the write operations by: i) reading and then incrementing the global write version, ii) writing the respective item in the data structure, including versioning the respective item with a respective version number equal to the global write version as read by the respective write operation prior to the increment, and then iii) generating a release indicator indicating the respective version number. The writer is further configured to send release signals corresponding to at least some of the release indicators to the reader, each release signal signalling the respective version number, but to refrain from sending release signals corresponding to any release indicator indicating a higher respective version number before the release indicators indicating all lower version numbers have been generated. The reader is configured so as, upon receiving each release signal sent by the writer, to update the global read version to be equal to the respective version number as signalled in the release signal. The reader is configured to perform the group-read operation by: reading the global read version at the start of the group-read operation, and then selectively reading items from the specified range of keys in the data structure based on having version numbers equal to or less than the global read version as read at the start of the group-read operation, passing over (i.e. ignoring) items in the specified range that have a greater version number.

Thus individual items are each given a local write version number, whilst the data structure as a whole is associated with a global write version number and a separate global read version number (as opposed to a single global version number as in the conventional scheme). When a write operation is to be performed, the writer reads and increments the global write version (preferably atomically) and uses the value read (from before the increment) as its write version. The write operation versions the items it creates with its write version. Before it can complete, a write operation must then release its respective updates. Writes are released in version order: when a write operation waiting to complete becomes that with the lowest unreleased (uncommitted) write version, it updates the global read version with its own write version. Each read operation observes the global read version at the start of the read operation and uses it as its read version. Readers only read items that have a version smaller or equal to their read version and ignore the rest.

Consider again the example of the range scan of keys 1-100 and two writes of items with keys 30 and 90, the former starting before the latter. The reader could start I) before 30 and 90 are released, or II) after 30 is released but before 90 is released, or III) after both 30 and 90 are released. In case I), the reader would ignore both 30 and 90 even if they have been inserted in the meantime, because their versions are greater that its read version. In case II), the reader would have to see 30, because 30 gets released only after it is completely inserted. If it observes 90, it would ignore it because 90's version would be greater than the reader's read version. In case III), the reader would observe both 30 and 90 because they have to be inserted in order to be released.

Because the read version can be behind the latest write version, and because the reader is configured to ignore items with a version higher than its read version, then the reader does not wait on items currently being updated by the writer. The need for locks on reading occurs in the prior scheme because incrementing the global version number and publishing a write to the reader are the same thing—as soon the later write operation increments the global version number, the reader jumps straight ahead to trying to read all items versioned with that latest version number. Whereas in the presently disclosed scheme, incrementing the write version and publishing the write to the reader are split. By using two global version numbers, read operations only access items for which the commit is complete, without having to wait for concurrent operations.

In embodiments a write operation may still place a write lock on the item that it is writing, in order to prevent other write operations trying to write to the same item at the same time. Versioning the write happens after resolving the write lock. The write lock may be implemented by temporarily setting the version number of the item to an invalid value (also called the "unspecified" value herein), somewhat similarly to the prior art. However, in the presently disclosed scheme, the reader can safely ignore items with the unspecified version number because it knows it is using a read version less than the individual version number with which the item will be versioned once it is released.

In embodiments, the system may support multi-write atomic operations, i.e. where two or more write operations are performed in a single atomic operation of the processor. The presently disclosed scheme also ensures that, in such cases, write operations are still linearizable. Returning to the above example, if the two writes are merely concurrent, then one could linearize them in any order. If there are two writes that are merely concurrent (but not atomic), one could linearize them in any order. Just because the write to the item with key 30 started before 90, does not mean it will be linearized before 90. If a scan sees 30 and doesn't see 90, one could linearize them such that 30 comes first. If it sees 90 and doesn't see 30, then one could linearize 90 first and still have a correct execution. However, if both 30 and 90 are a part of the same multi-write atomic operation, then the reader needs to either see them both or neither. The above-described scheme also ensures that this is also the case.

A disincentive against using the presently disclosed scheme is that it requires signalling between the writer and reader to increment the global read number in order to release items. The signalling overhead of this may not be insignificant, especially if the signalling is via a bus such as a PCIe bus, for example. Embodiments may mitigate this by batching together updates for release. I.e. the writer does not have to send a release signal corresponding to each individual writer operation to increment the global read number by 1 each time, but instead may only send a release signal every few writes to increment the global read version in jumps of more than one at a time.

In other words the writer may be configured so as not to send a release signal corresponding to every one of the release indicators to the reader, but instead to send, one after another, at least some release signals corresponding to release indicators with discontiguous version numbers, so as to batch together the release of some of the items.

Batching together the release of multiple writes mitigates the signalling overhead of signalling releases to the reader. However this is not essential, and in other embodiments one could simply send an individual release signal for each write and live with the signalling overhead; or in some systems, especially if the writer and reader are closely connected, then the signalling overhead of sending individual release signals might not be too bad anyway.

One example protocol for batching releases is as follows. This may apply where the writer comprises a plurality of concurrent threads, and at least some of the write operations are performed by different ones of the threads. In such embodiments, the system may comprise a circular buffer comprising N slots having index i=0 ... N−1. Each write operation places its release indicator in a slot i_r in a circular buffer with N slots, where i_r=v mod N, where v is the respective version number. The writer is configured to so as when a write operation places a respective release indicator in the circular buffer, to check whether the slot with the immediately preceding index contains the release indicator indicating the next lowest version number, and

- if not, leave the respective release indicator in the circular buffer to allow the respective item to be released by another write operation, but
- if so, determine a batch of release indicators comprising the respective release indicator and any release indicators occupying contiguous slots immediately forward of the respective release indicator indicating a contiguous run of version numbers, and send to the reader a single release signal signalling the greatest version number in the determined run, causing the reader to update the global read version to this version number, thereby releasing a batch of items corresponding to the batch of release indicators.

An advantage of this particular protocol is that it exploits the non-determinism of the writer to create the batches, which is more flexible than simply batching together every run of n contiguous items. However this is just one example, and an alternative would indeed be to batch together fixed runs of n items or create a batch every t microseconds, or such like, or just not use batching as mentioned above.

In embodiments the data structure may comprise a tree-structure, e.g. a B+ tree or other B-tree. In some such embodiments each leaf node may comprise a first block and a second block, where items in the first block are stored in order of key, whilst newly inserted items are added to the second block in chronological order (i.e. the order in which they happen to be written). The first block may have a larger maximum size than the second block, and hence the first block may be referred to as the "large block" and the second block as the "small block". The small block may be merged into the large block if a new write would cause it to exceed its maximum size.

In embodiments, the disclosed scheme for versioning and releasing items may only be applied to the items in the second block. The items in the first block may instead be associated with a single node version for the respective node.

However, this is not limiting and in other implementations the disclosed scheme could be applied to all the items in a node, or other subdivisions of a node. Further, the disclosed scheme is not limited to use in a tree-based structure, and could also be applied to the writing and reading of items in other forms of data structure such as a table-based structure.

In embodiments the writer may be implemented in software but the reader may be implemented in custom hardware, e.g. in a programmable gate array (PGA) or field programmable gate array (FPGA). More generally however the writer could be implemented in hardware (e.g. a hardware accelerator) and/or the reader could be implemented in software.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To aid understanding of embodiments disclosed herein and to illustrate how such embodiments may be put into effect, reference is made, by way of example only, to the following drawings in which:

FIG. 7 schematically illustrates a method of inserting a new item into a small block;

FIG. 13 schematically illustrates an example of a release ring with eight slots.

DETAILED DESCRIPTION OF EMBODIMENTS

Figure 1:
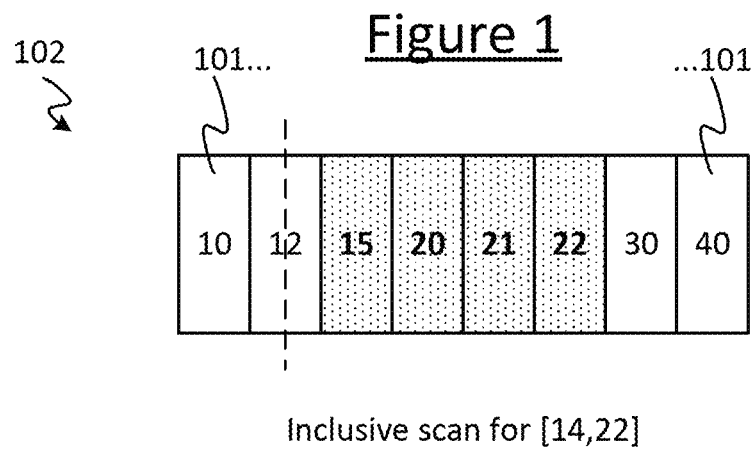
FIG. 1 schematically illustrates a range scan in the form of an inclusive scan for an example key interval [14, 22], whereby the interval formed by the keys of the returned items is the biggest subset that falls within the input interval.

The present disclosure provides a new form of multi-version concurrency control (MVCC) that works based on two global versions—a read version and a write version. This allows the writer to publish all the updates of an operation (in embodiments atomically), without needing to block the reader, allowing reads to be wait-free and not wait on updates in software.

One exemplary implementation uses a release ring data structure, discussed in more detail later with reference to FIG. 13. The disclosed release ring data structure allows the writer to efficiently batch release operations to amortize the cost of communication with hardware. Such a data structure could be used in any scenario where in-order release of operations is required and where this involves an expensive signaling operation.

Embodiments also provide a node layout with each node consisting of a first and a second block. Preferably the first block has a larger maximum size (in bytes) than the second block, and hence the first and second block may be referred to as the large block and small block respectively. The following will be described by way of example with reference to large and small blocks, but anywhere below this could in principle be replaced more generally with "first block" and "second block" respectively.

The large block is sorted, which allows for efficient searching of a node. Sorted in this context means that the items are sorted by key, such that the order of the items by key is made the same as the order the items appear in the address space of the memory (either virtual or physical address space depending on implementation). The small block on the other hand comprises the latest inserts and deletes to the node and is in chronological order, which allows for fast updates. The alternative would either be to keep the entire node unsorted, resulting in fast update performance, but poor search performance; or the entire node sorted, resulting in fast search performance, but poor update performance.

Optionally shortcut keys may be used in the large block. This allows a node search to examine only a small part of the entire node, resulting in better performance.

As another, alternative or additional optimization, in embodiments "back pointers" may be included in the small block. These allow to establish order between items in the small and the large block without comparing the keys. This results in an efficient implementation (e.g. in hardware) as it is not necessary to compare the entire keys.

As another optional optimization which could be used together with or independently of the shortcut keys and/or back pointers, in embodiments "order hints" may be included in the small block. Order hints in the small block allow for very efficient hardware to establish the sorted order of items in the small block without comparing keys.

Yet another optional optimization is to provide synchronization of complex updates. In this case, when nodes are split or merged, the writer updates the tree by creating a copy (e.g. a thread-private copy) of the sub-tree and then swapping it in with a single pointer update in the page table. The disclosed techniques may be particularly (but not exclusively) applicable in system where the writer is implemented in software run on one or more processors, but the reader may be implemented in specialized hardware. The hardware may comprise an FPGA, or a PGA, or even dedicated (i.e. fixed-function) circuitry such as an ASIC (application specific integrated circuit). Specialized hardware that implements an index data structure is hardware that has dedicated pipelines to execute data structure operations. This is in contrast to general-purpose CPUs that implement an instruction set and execute programs that implement data structure operations using that instruction set. Specialized hardware has several advantages: it has higher throughput per watt, more predictable and lower latency, and can be cheaper than the same functionality running as software on CPUs. The main disadvantage of using specialized hardware is that it is harder to design, it takes more time to build than software, and in the case of dedicated hardware it cannot be changed after it is built, so it is typically used only for very widely deployed functionality.

Embodiments disclosed herein provided an in-memory B-tree that benefits from the best of both worlds: all operations can be executed in software on the CPU while lookup and scan operations can be executed on the specialized hardware we designed. In many workloads lookups and scans are predominant operations, meaning that most operations benefit from hardware offloads. Lookups and scans are simpler than update operations, meaning that the entire system can be built and deployed faster. In one example implementation the memory may be a DRAM-based host memory, but this is not limiting, and in other examples the B-tree can be stored in, e.g., storage NVM devices such as SSD or 3D-Xpoint drives.

A consideration when designing such a hardware-software data structure is to ensure the benefits of a pure hardware design carry over to the hybrid data structure. For example, one benefit of running operations in specialized hardware is low and predictable latency. If hardware operations need to wait for software operations, their latency can be significantly impacted, losing most of the benefit of hardware specialization. Also, ensuring consistency between software and hardware is challenging and some implementations might decide to implement weak consistency models for simplicity, but a weaker consistency model can be harder to use. The techniques disclosed herein may be applied in order to address one or more of such issues and/or others.

Embodiments disclosed herein provide an in-memory B-tree which is strongly consistent (it guarantees linearizability), supports multi-key atomic updates, and allows for lookups and scans in hardware that do not wait on software or retry. A B-tree is very widely used, so this idea has very wide applicability and it can warrant building specialized hardware.

Note however that the scope of the present disclosure is not limited to implementing writes in software and reads in hardware. In other possibilities, the writer could be implemented in some form of hardware such as an FPGA or ASIC, and/or the reader could be implemented in software. Examples of the above-mentioned techniques will now be described in more detail with reference to the Figures.

The following will be described in terms of a B-tree, but more generally the ideas disclosed herein such as the multi-version concurrency control, the different types of read and write operations, the use of the large and small blocks, the shortcut keys, the back pointers, the order hints, and/or the synchronization of complex updates (splits and merges), may be applied in any tree structure or other form of data structure for storing key-value pairs.

TREE STRUCTURE

A key-value store such as a B-tree stores data as key-value pairs (also called items). Items may be of variable size, though depending on implementation, the data structure may place a limit on the total allowed size of an item, e.g. to 512 bytes, or in some implementations may make them a fixed size to simplify implementation. Each key is associated with a single respective value; multiple key-value pairs with the same key are not permitted.

Figure 4:
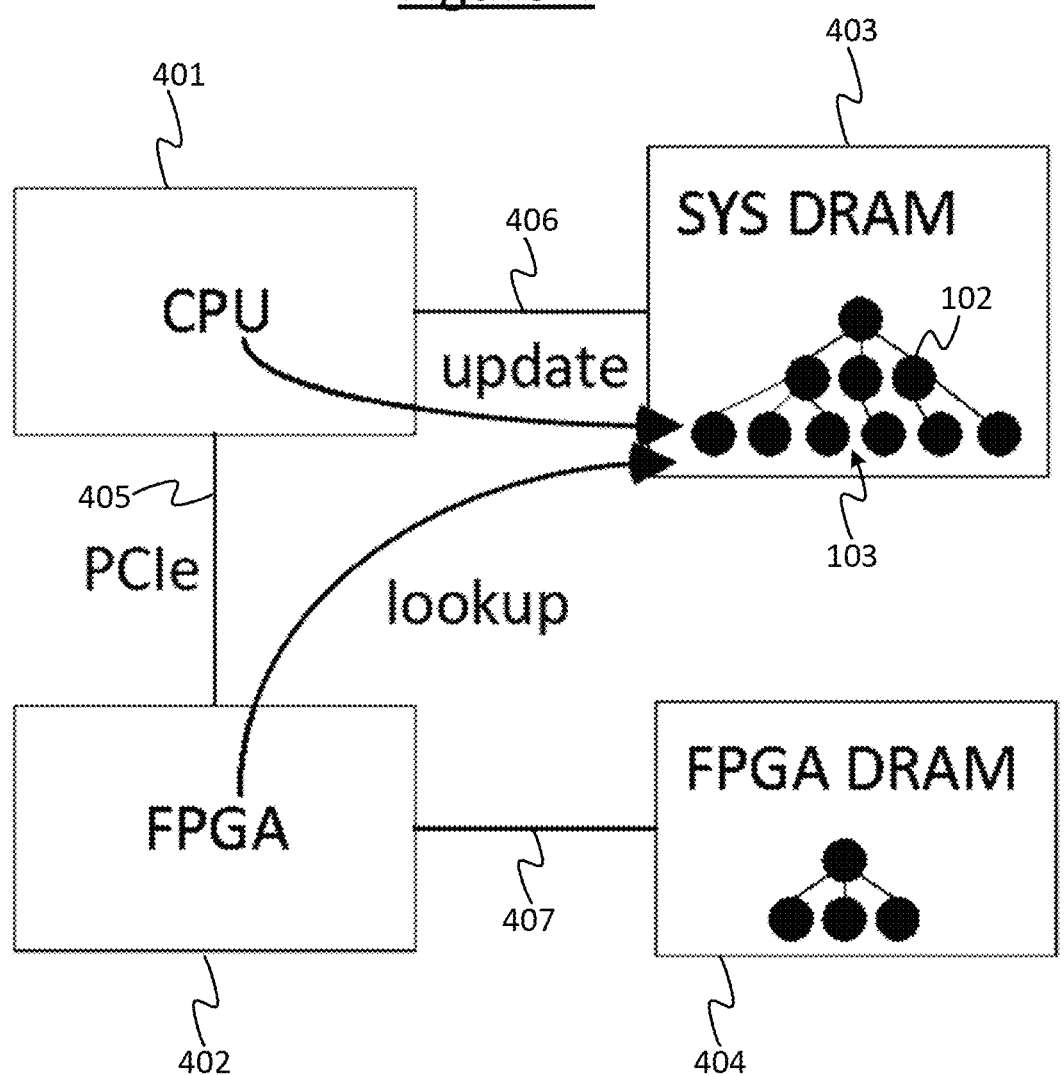
FIG. 4 is a schematic block diagram of a system in accordance with embodiments disclosed herein.
Figure 5:
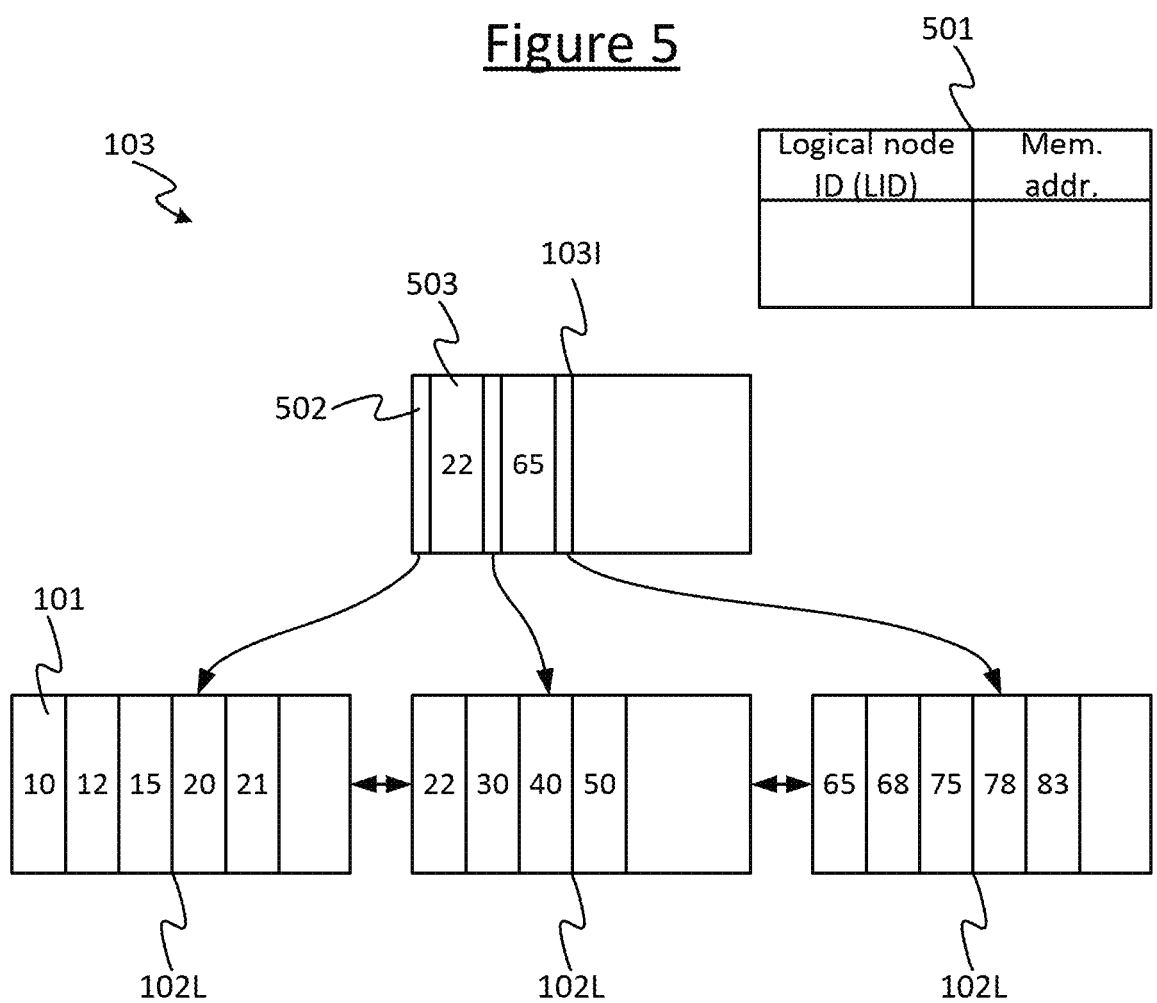
FIG. 5 schematically illustrates a data structure comprising a tree structure.

FIGS. 1, 4 and 5 illustrate, by way of example, elements of a tree structure 103 such as a B-tree. The tree 103 is a form of data structure, implemented in memory, which can be used as a key-value store. The tree 103 comprises a plurality of nodes 102, some of which are leaf nodes 102L and others internal node 102I. Each node 102 has a respective node ID, which may also be referred to herein as the logical ID (LID). Each leaf node 102L comprises a respective set of one or more items 101, each item 101 comprising a key-value pair (by way of illustration FIG. 1 shows a node 102 undergoing a range scan, but this is not limiting and is just one example of a type of read operation). A key-value pair comprises a key, which acts as an index of the item, mapped to a value, which is the content of the item. The numbers shown inside the items 101 in the figures are example keys (in practice the keys may run to much larger numbers but this is just for illustration). Each internal node 102I specifies a respective set of one or more children of the internal node. Once the tree has been built up, at least one or some of the internal nodes will have more than one child each (though when there is only one leaf in the tree e.g. when it is just created, the root node has only one child). Each internal node 102I also indicates which range of keys is encompassed by each of its respective children. The particular scheme shown in FIG. 5 with keys sandwiched between pointers, discussed later, is just one possible example for specifying this mapping.

By whatever means the mapping is implemented, the node IDs in the internal nodes 102I thus define edges between parent and child nodes, thereby forming a tree structure. Each internal node 102I is a parent of at least one respective child. Once the tree is built up, at least one or some of the internal nodes are each a parent of multiple respective children (though as mentioned above, when there is only one leaf in the tree the root will have a single child). A child of a given parent may be either a leaf node 102L or another internal node 102I. Leaf nodes 102L are only children, not parents (i.e. the leaves are the bottom of the tree, or put another way the terminus of the tree branches).

For a key to be "encompassed" by a child herein means either that: the child is a leaf node 102 containing the item (key-value pair) with that key; or the child is another internal node 102I that, via its mapping of node IDs to keys, ultimately leads to a leaf node 102I that contains the item with that key one or more levels (or "generations") down the hierarchy of the tree.

One of the internal nodes 102I at the top of the tree is the root node. If a writer or a reader is to write to or read from an item with a particular key, it starts by querying mapping of node IDs to key ranges specified in the root node in order to find which child of the root encompasses the required key. If that child itself is another internal node 102I, the writer or reader then queries the mapping specified in that node to find which child of the next generation encompasses the required key, and so forth, until it finds the leaf node 102L containing the item with the required key.

In embodiments key comparison may follow the semantics of the C memcmp function, meaning that integer keys should be stored in big-endian format to maintain integer comparison semantics. However this is just one possible example.

In embodiments the B-tree may take the form of a B+ tree, whereby only leaf nodes 102L contain key-value pairs, and internal nodes 102I only contain node-ID to key-range mappings.

READ/WRITE OPERATIONS

A tree structure such as a B-tree may support read operation types of: individual lookup, and/or range scan. It supports write (update) operation types of: insert, modify, and/or delete. Example semantics of such operations are described below.

Lookup: this takes a key as the argument and returns the value associated with the key if present in the tree. Otherwise, it returns status "not-found".

Figure 2:
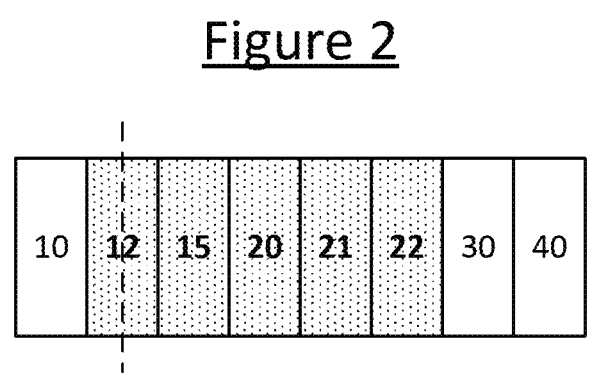
FIG. 2 schematically illustrates range scan in the form of a covering scan for an example key interval [14, 22], whereby the interval formed by the keys of the returned items is the smallest superset that contains the input interval.
Figure 3:
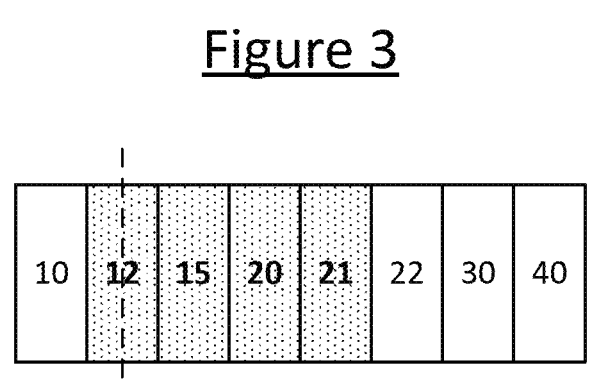
FIG. 3 schematically illustrates range scan in the form of a covering scan for an example key interval (14, 22)

Scan: this takes two keys as the input argument and returns all key-value pairs from the tree with keys in the closed interval [low-key, high-key]. In embodiments two types of scan are supported: inclusive scan and covering scan. FIGS. 1, 2 and 3 illustrate the difference. (l,u) means that lower bound l and upper bound u are not included in the result even if they are in the tree. [l, u] means that they are included, if they are in the tree. Combinations [l, u) where l is included, but u is not, and (l, u] where l is not included but u is are also possible.

With the inclusive scan (FIG. 1), the interval formed by the keys of the returned items is the biggest subset that falls within the input interval. Inclusive scan may be used when serving database queries like "get all items with keys between 36 and 80". The result does not include the items with key 35, even if there is no item with key 36. With the covering scan (FIGS. 2 and 3), the interval formed by the keys of the returned items is the smallest superset that contains the input interval. In the case of FIG. 2, the item with key 22 is returned but in FIG. 3 it is not. The covering scan is useful when querying storage meta-data like "get disk blocks that store data at offset range 550-800 from the beginning of the file". The result includes the highest key before 550 and the smallest key after 800 (i.e. the keys just either side of the specified range), meaning that all disk blocks that store data in the requested range are returned.

Insert: this takes a new key-value pair to insert. If an item with the specified key does not exist in the tree, the key-value pair is inserted into the tree. Otherwise, the operation does not update the tree and returns status "already-exists".

Modify: this takes an existing key-value pair to update. If an item with the specified key exists in the tree, the value is updated to the value of the input argument. Note that the value can be of different size than before. Otherwise, the operation does not update the tree and returns status "not-found".

Delete: this takes a key of the item to remove. If the item exists in the tree, it is removed. Otherwise, the operation returns status "not-found".

System Architecture

FIG. 4 shows an example system in accordance with embodiments. The system comprises a writer 401, a reader 402, a system memory 403, and optionally a local memory 404 of the reader 402. The tree structure 103 is stored in the system memory 403. The writer 401 and reader 402 are operatively coupled to the system memory 403. For example, the reader 402 may be operatively coupled to the writer 401 via a bus 405 such as a PCIe bus; whilst the writer 401 may be operatively coupled to the system memory 403 via a separate, local or dedicated connection 406 that does not require communication via the bus. The writer 401 may be arranged to access the system memory 403 to write to the tree 103 via the local connection 406, whereas for the reader 402 to read from the tree it may have to access the memory 403 via the bus 405. The reader 402 may be connected to its local memory 404 via a local connection 407 of its own, and may be arranged to thereby cache a part of the tree 103 in the reader's local memory 404.

The memory 403 may take any suitable form and may comprise one or more memory media embodied in one or more memory units. E.g. the memory media may comprise an electronic silicon-based medium such as SRAM (static random access memory) or DRAM (dynamic RAM), EEPROM (electrically erasable and programmable ROM), flash memory, etc.; or a magnetic medium such as a magnetic disk or tape; or even a more exotic form such as a re-writeable optical medium or synthetic biological storage; or any combination of any of these and/or other types. The memory unit(s) in which the memory 403 is embodied could comprise an on-chip memory unit on the same chip as the writer 401, or a separate unit on the same board as the writer 401, or an external unit such as an SSD (solid state drive) or hard drive which could be implemented in the same housing or rack as the writer 401 or even at a different location in a separate housing or rack, etc.; or any combination of these. In one particular embodiment, as illustrated, the memory 403 comprises DRAM which may be implemented on the same board or chip as the writer 401. For instance in one particular example, the system uses DRAM boards that are plugged into the board on which the CPU resides. But this is not limiting.

The reader's local memory 404, if used, may also take any suitable form comprising any suitable medium in any one or more units. In one particular embodiment, as illustrated, the reader's local memory 404 comprises DRAM which may be integrated into the reader 402 or implemented on the same chip or board as the reader 402.

In embodiments, the writer 401 is implemented in software stored in non-transitory computer readable storage of the system and arranged to run on one or more processors of the system, e.g. a CPU; whilst the reader 402 is implemented in hardware, which may take the form of an FPGA, PGA or even dedicated (fixed-function) hardware circuitry, or a combination. The following may be described in terms of such embodiments, but it will be appreciated that for any of the techniques described below it is not excluded that the writer 401 could instead be implemented in hardware and/or the reader 402 in software.

The storage used to store the software of the writer 401 (and/or reader in alternative embodiments where this is implemented in software), may take any suitable form, such as any of those described above, or alternatively a read only memory (ROM) such as an electronic silicon-based ROM or an optical medium such as a CD ROM, etc. The one or more processors may comprise e.g. a general purpose CPU (central processing unit); or an application specific or accelerator processor such as a GPU (graphics processing unit), DSP (digital signal processor), cryptoprocessor, or AI accelerator processor, etc.; or any combination of any of these and/or other kinds.

In one particular embodiment, as illustrated, the writer 401 is implemented in software run on a CPU and the reader 402 is implemented in an FPGA. Embodiments below may be described in terms of such an example, but it will be appreciated that this is not limiting.

The B-tree stores data in system memory 403. In embodiments this allows storing trees as large as the system memory (typically hundreds of GB) but comes at the cost of the reader 402 (e.g. FPGA) accessing system memory over PCIe 405. The reader (e.g. FPGA) 402 may keep a cache of upper levels of the tree in its local memory (e.g. DRAM) 404 to speed up the execution. In one example implementation, the reader 402 records the LID of the root node and the number of tree levels in its local register file.

The B-tree may be designed to allow storing data on secondary storage too, to allow storing even larger trees. Emerging very low-latency NVMe (Non-Volatile Memory Express) devices make this an attractive option even for low-latency scenarios.

In embodiments, the FPGA 402 executes only lookup and scan operations, and update operations are performed by the CPU 401. The synchronization between the CPU and the FPGA is preferably made lightweight. Supporting only read operations on the FPGA allows read-dominated use cases to benefit from hardware offload without implementing all operations in hardware.

Data Structure

In embodiments the B-tree 103 is a B+ tree, which means that key-value pairs 101 are only stored in leaves 102L, while internal nodes 102I store key indicators and pointers to child nodes.

FIG. 5 shows an example of a two-level tree, but the principles described here could apply to a tree with any number of levels (i.e. any number of levels of parent and child).

The data structure that comprises the tree 103 further comprises a page table 501. The page table 501 maps the node IDs (also called logical IDs, LIDs) to actual memory addresses where the respective nodes 102 are stored in the system memory 403. This way the writer 401 or reader 402 can locate a node 102 in memory 403 based on its node ID (LID), by looking up the address based on the node ID in the page table 501.

As mentioned, each internal node 102I comprises information mapping each of its child node IDs to an indication of the range of keys encompassed by the respective child. FIG. 5 illustrates one example of how this may be implemented.

Figure 6:
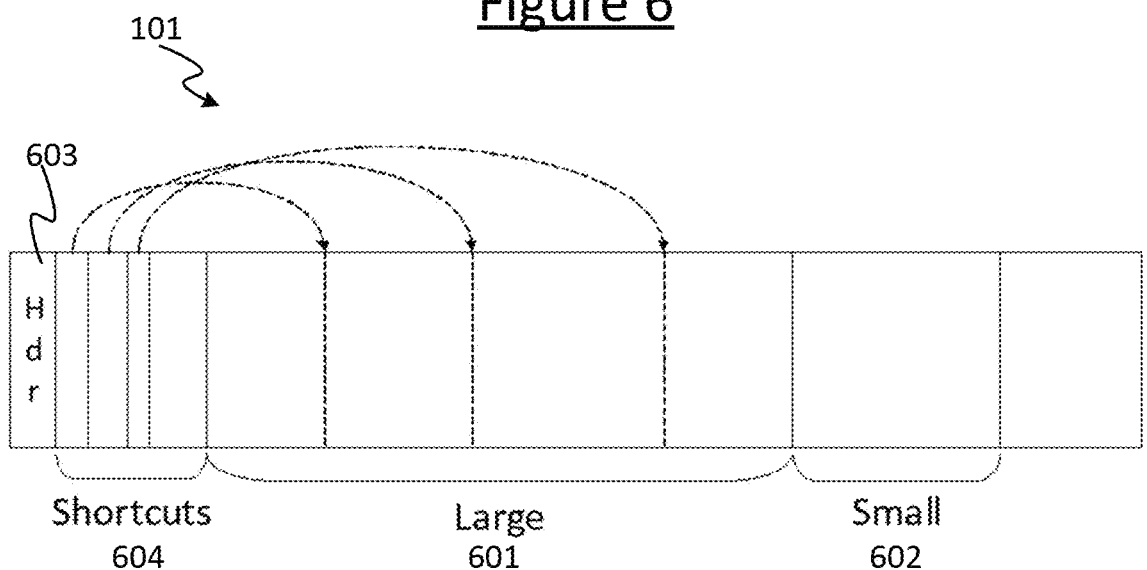
FIG. 6 schematically illustrates a node comprising a small and large block.

In this example, each internal node 102I comprises a set of node pointers 502 and key indicators 503. Each node pointer 502 is a pointer to a child node specified in terms of node ID (logical ID, LID). Each key indicator 502 in this example specifies one of the keys at the boundary of the range encompassed by a child. In each internal node 102I, a pointer 502 with an indicator 503 of key l left of the pointer, and key u right of it, points to a subtree that stores keys in the interval [l, u). In addition, each internal node 102I stores a pointer 502 to a subtree with keys that are lower than the lowest key in the internal node. This leftmost pointer is stored in the node's header 603 (e.g. see FIG. 6). In other words each key indicator is sandwiched between a pair of pointers, and the key indicator specifies the boundary between ranges encompassed by the children pointed to by the pointers either side of the key indicator. Put another way, internal nodes store the leftmost child lid. They basically store X keys and X+1 pointers. The leftmost is the +1 pointer. In the particular example shown in FIG. 5, a new item with the key in interval [22, 65) would be inserted in the middle leaf; items with keys less than 22 would be inserted in the leftmost leaf; and keys greater or equal to 65 into the rightmost leaf.

It will be appreciated that the scheme shown in FIG. 5 for mapping children to key ranges is just one example. Another example would be e.g. to store all boundary keys first in the node and then follow them with all LIDs.

In some embodiments, each leaf 102L may also store a pointer to the leaf that is to the left of it and to the leaf that is to the right of it to simplify implementation of range scans.

The B-tree 103 grows from the bottom (as any other B-tree). If during an insert the new item 101 cannot fit into the leaf 102 it maps to, the leaf is split into two. The old leaf's items are split in half and the pointer to the new leaf is inserted into the parent node. If the parent node becomes full, it is also split. The splitting can continue recursively up to the root of the tree. If the root gets split, a new root is created which increases the height of the tree. When a leaf becomes empty because all items were deleted from it, it gets deleted from the parent. Alternatively, another option is to merge the leaves when they become less than half-full to maintain the space invariant of the B-tree.

NODE LAYOUT

In embodiments, B-tree nodes 102 may be 8 KB in size, to align them to the DRAM page size. They may be allocated in pinned memory that cannot be moved by the operating system, so as to allow the reader 402 (e.g. FPGA) to access the nodes 102 by using their physical memory address. However this is not essential.

Internal nodes 102I preferably do not store addresses of child nodes directly. Instead, they store logical identifiers (LIDs) for each node. In one example LIDs may be 6 bytes in size, limiting the maximum size of the tree to 2^61 bytes. The mapping from a node's LID to the virtual and/or physical addresses of the node is maintained in a page table 501. The page table 501 may be stored both in system memory 403 and in the FPGA-attached memory 404. When a new node's mapping is created or when a node's mapping is changed, the writer 401 (e.g. CPU) updates the table 501 in system memory 403. If a cache is kept at the reader side, the writer 401 also issues a command (e.g. over PCIe) to the reader 402 (e.g. FPGA) to update the copy of the table in the reader's attached memory 404. Alternatively the reader could poll the tree for updates.

Addressing nodes using LIDs provides a level of indirection, e.g. allowing storage of nodes on NVMe devices. It also helps with synchronizing accesses to the tree, as update operations may perform copy-on-write of nodes in some cases.

In embodiments, the layout of internal nodes 102I and leaf nodes 102L is the same. For example see FIG. 6. The node header 603 may be stored in, e.g., the first 32 bytes of the node 102. The header 603 may contain: a field specifying the type of the node 102 (internal or leaf), the number of used bytes in the node, a lock bit and a node version number to synchronize accesses to the node, and/or several other fields discussed below. In an example such as shown in FIG. 5, the header 603 of an internal node 102I also stores the LID of the leftmost child. The header of a leaf node 102L may store the LIDs of the left and the right sibling. Keys and values may be of variable size, so they may be stored as blobs. Each blob has, e.g., a 2-byte header that specifies its size. LIDs may be stored without a header as their size is known. Values may be stored inline in B-tree nodes 102L to improve sequential access performance. Values larger than 512 bytes may be stored outside of the B-tree 103 and the pointer to the value is stored in the leaf 102L.

Irrespective of the choice of particular implementation parameters such as node size etc. exemplified above, in embodiments each leaf node 102L may comprise two blocks—a large block 601 and a small block 602. To implemented this, a pointer to the boundary between the blocks may be stored in the node's header 603. The pointer may be expressed as an offset relative to the start of the large block 601, for example. The large block 601 stores items in sorted order and the small block 602 stores a log of the recent updates. When the small block 602 becomes larger than a threshold (e.g. set to 512 bytes), it gets merged with the large block 601. By splitting the node 102L into a large and a small block, read operations benefit from accessing mostly sorted data, without the overhead of sorting the node on every update.

The two-block layout has the advantage of balancing workload between writer and reader. If instead all entries were simply added in chronological order, unsorted by key, then this would be very quick for the writer. However the reader then has to sort through the items at read-time in order to perform an individual read or a range scan (at least a range scan requires sorting—an individual read could just, it is simpler to implement both lookups and range scans in the same way, using sorting). On the other hand, if the writer placed all new entries in sorted order every time it performs a write, this would make reading very quick for the reader, but would places a larger burden on the writer at write-time. The two-block approach provides a compromise between these two approaches.

Entries in the small block 602 may be either newly inserted items or delete markers. As a further optional optimization, each entry in the small block 602 may further store a pointer (e.g. 2 bytes long) to an item in the large block 601. As a convenient label this may be referred to as a "back pointer" (though the term "back" is not necessarily meant to limit to any particular direction in the physical address space or such like). In one example implementation, for a newly inserted item 101, the pointer points to the first item in the large block 601 with key greater than the key of the new item added to the small block 602. Or for a delete marker, the pointer points to the deleted item. The pointer may be expressed as an offset within the node 102. It can be used by the reader 402 to establish the order between items 101 in the large and small blocks without comparing their keys, which is a useful optimization, especially if the reading is implemented in hardware. As another optional optimization, each item in the small block 602 may comprise a field (e.g. 1 byte long) that stores its index in the sorted small block at the time of item's insertion. I.e. this is the order of the item at the time of being inserted. This may be referred to as an "order hint". These indexes are "replayed" by the reader 402 while scanning the small block during the search to rebuild the current sorted order. The order is stored in a temporary "indirection" array of the reader 402, e.g. in FPGA registers, which is used to access the items in the sorted order. This makes the sorting more efficient, especially if implemented in hardware, and doesn't introduce significant latency.

FIG. 7 shows an example of the steps to insert a new item 101 into the small block 602. Step a) shows a node 102 before the insert. At step b), the item 101 is copied into the small block 602. It is not yet visible to the reader 402. At step c) the size of the data indicated in the node header 603 is changed to include the new item.

As another optional optimization, to optimize the search for a key in a node, the large block 601 may be divided into segments of roughly equal size. The keys at the boundaries of segments, together with the pointer to the boundary, are stored in a shortcut block 604, which may be stored immediately after the node header 603. The search for a key starts by scanning the shortcut block and identifying the segments that might contain the key. The search examines only those segments and the small block, which reduces the amount of data read from memory. For example, if the performance bottleneck is the PCIe bandwidth between the reader (e.g. FPGA) 402 and the system memory 403, this optimization significantly improves performance. For 32-byte keys and smaller, a search reads roughly 1.5 KB of data from the 8 KB node, resulting in a 5-fold performance improvement over a more straightforward implementation that scans the entire node. The shortcut keys may be selected during the merge of the large and the small block 601, 602.

Node Cache

The FPGA 402 may have several gigabytes of DRAM 404 attached directly to it (e.g. 4 GB). This memory may not be big enough to store the entire B-tree 103 in all use cases, but it may be big enough for the first several levels, so in embodiments it may be used as a cache to reduce latency and increase throughput of the B-tree. For instance, the cache 404 may be allocated at, e.g., the 8 KB node granularity to reduce the amount of meta-data, but data may be fetched in 256-byte chunks, to reduce the amount of unwanted data read over PCIe 405. The FPGA 402 may keep a 32-bit occupancy bitmap for each cached node 102 to keep track of the chunks that are in the cache 404. The consistency of pages between the cache 404 and system memory 403 may be maintained by invalidating cached pages whenever a page mapping is updated. Software on the CPU 401 may send the page table update command over PCIe 405 when a page mapping is updated, and the FPGA 402 may invalidate the page by clearing the occupancy bitmap.

Page Table

The reader 402 (e.g. FPGA) may maintain a local copy of the page table 501 stored in its local memory 404, e.g. DRAM, which may be attached to the FPGA device 402 for example. In embodiments each entry in the table is 8 bytes in FPGA memory, but 16 bytes in system DRAM. This is because in embodiments the copy in system DRAM stores two addresses (virtual and physical) and the copy in FPGA DRAM memory stores one address (only physical).

Entries in the page table 501 store the memory address of the nodes 102 mapped to their respective LIDs. In general these could be physical or virtual addresses depending on implementation. In embodiments the writer employs virtual memory mapping and the page table 501 at the writer side stores the virtual addresses of the nodes mapped to their respective IDs. In embodiments where a copy of the page table is kept in the FPGA 402, entries in the FPGA page table copy may store the physical address of the nodes mapped to their respective LIDs. E.g. with an 8-byte entry and 4 GB of DRAM, the system supports trees up to 4 TB, which is large enough for main memory trees on today's servers. Larger trees may be supported by having the reader 402 (e.g. FPGA) access the page table 501 in system memory 403 or an NVMe device, or by increasing the B-tree node size.

The page table 501 is not absolutely essential in all possible embodiments. A less preferred alternative would be to use memory addresses directly as node pointers in the internal nodes 102I.

Synchronization (Multi-Version Concurrency Control, MVCC)

According to the present disclosure, the lookup and scan operations are wait-free—the update operations by the writer 401 (e.g. executing on the CPU) do not block lookups and scans by the reader 402 (e.g. executing on the FPGA) or cause them to abort and retry. In other words, read operations are wait-free, meaning that they can complete without waiting on other concurrent operations. For example in an implementation where the writer is implemented in software and the reader in custom hardware, this means that the lookups and scans on the combined software-hardware tree have the same low and predictable latency as with the pure hardware implementation.

To achieve this, a form of multi-version concurrency control is used to ensure that read operations can always access a consistent snapshot of data without waiting for update operations in progress. Two shared version numbers are maintained: the global write version and the global read version. E.g. each may be 64 bits long. With a 64-bit version number this is large enough that in practice it will never wrap around. With a smaller version bit width it might happen, depending on how long the system is used, but extra steps could be put in place to handle the wrap around.

Each write operation reads and increments the global write version and uses the value read as its write version. Preferably the read and increment is done atomically. A write operation versions the item 101 that it creates with its write version. The write operations release the updates in the version order: each writer updates the global read version when it becomes the writer with the smallest write version. Writers also send the write version to the reader 402 (e.g. FPGA) when releasing the updates. Each read operation observes the global read version on start and uses it as its read version. The read operation (e.g. a range scan) only reads items that have a version smaller than or equal to the operation's adopted read version, and ignore the rest. By using two global version numbers, read operations always access items for which the commit is complete, without having to wait for concurrent operations. This means that reads are wait-free. At any point in time, the items that are older than (version is less than or equal to) the global read version are committed and accessible to new read operations. The nodes and items newer than the global read version are still in the process of being committed and are not accessed by the readers. Update operations may be synchronized by using node write locks. These locks are ignored by read operations.

Ordering the release of updates increases the cost of update operations. The conventional alternative scheme uses a single global version number and does not incur this cost. In the conventional approach, the global version is used to obtain both the write and the read version for operations. The update operations atomically reads and increment the global version and use the value read as their write version. After obtaining the write version, the write operation assigns it to all the items it is updating. The item is released as soon as it is assigned the version and unlocked (each newly inserted item initially has an undefined version, a special value which could be e.g. 0). The read operations read the global version at their start and use it as their read version. In this scheme, a read operation is not guaranteed that the items that haven't yet been assigned a version do not belong to its snapshot—the writer with the write version equal to the reader's read version might still be iterating over the items and assigning versions. For this reason, if the reader accesses an item that has not been assigned a version, it must wait until the version is assigned. This is done by having readers wait on the locks acquired by writers. This means that the reads are not wait-free. If implemented in the system shown in FIG. 4 for example, this would mean that operations running on the FPGA sometimes wait for operations running on the CPU, losing some of the benefit of building custom hardware. Instead however, the presently disclosed scheme uses wait-free reads at the cost of some performance penalty on the writers. As an optional optimization, the overheads of ordering are reduced by batching releases, e.g. using a release ring data structure that allows efficiently determining the release order (see discussion later with reference to FIG. 13). The same data structure may also be used to batch the release timestamp updates to the FPGA.

The presently disclosed versioning scheme ensures linearizability of writes and reads without requiring reads to wait on locks. Linearizability refers to the property that the order of the effects of the operations is as if the operations were each performed at a single infinitesimal or atomic moment in time (even though in reality each operations takes multiple cycles).

In embodiments, the presently disclosed versioning scheme is only used for items 101 in the small block 602. In this case, the items in the small block 602 and the large block 601 are versioned differently. All the items 101 in the large block have the same version, which is stored in the header of the node 102L. This may be referred to herein as the node version. The node version is the write version of the update operation that created the node buffer. Each node 102 (whether a leaf or internal node) can also store a pointer to an older version of that tree node. A reader that observes a node that is newer than its read version ignores the node and follows the chain of old pointers. It keeps following the old pointer chain until it reaches the node with a version lower or equal to its read version. The version of an item in the small block is stored together with the item. To reduce the size of items in the small block, the item version may be stored as a version delta relative to the node version (e.g. a 5-byte version delta instead the entire 8-byte version). In this case, if an update would cause the delta version to wrap around, it merges the small and the large block of the node. The reader ignores all items in the small block that are newer than its read version.

To ensure all operations observe a consistent snapshot, a deleted node 102 is preferably kept until none of the active operations are accessing a snapshot to which the node belongs. Merging or splitting a node also involves deleting an old node (e.g. see merged leaf 102L in FIG. 11, or the split internal node 102I and leaf nodes 102L in FIG. 12, to be discussed in more detail later). To garbage collect the nodes that are not accessible anymore, the system may use, e.g., an epoch-based memory manager (similar to RCU in Linux kernel). In this case each thread of the writer 401 keeps an operation sequence number and exposes the current sequence number to the memory manager. Similarly, the reader 402 (e.g. FPGA) assigns a sequence number to each operation and exposes the sequence numbers of the newest and the oldest active operation to the memory manager, e.g. over PCIe. When a thread removes a node 102 from the tree 103, it puts the node into a garbage collection list, together with the sequence numbers of all active threads and of the newest active operation of the reader 402 (e.g. FPGA). Periodically, the thread scans the garbage collection list and deletes all nodes that are not reachable by the reader 402 (e.g. hardware). If a thread's current sequence number is greater than the recorded sequence number, it cannot reach the node anymore. Similarly, if the oldest active operation of the reader 402 is newer than the recorded FPGA sequence number, the reader cannot access the node. When a node is not accessible by any of the writer's threads or the reader, it can safely be deleted. Alternatively, one could use node versions to detect unreachable tree nodes.

Note: in the prior, conventional scheme, it would not be desirable to simply have the reader pass over locked items. See the "ASIDE" section later for a discussion of this.

Look-Up

A lookup operation first reads the global read version and uses it as its read version. It starts at the root and traverses the internal tree nodes 102I at each level to find the pointer to the node 102 at the next level. Each lookup terminates at a leaf 102L. If the leaf contains the key, it returns the associated value. Otherwise, it returns the status indicating that the key is not stored in the tree. In embodiments that use a separate node version for the first block 601, each node has a node version in the header and a LID of the previous node version. The node version acts as a form of timestamp. If the node version in the header is greater than the read version used by the lookup, the lookup reads the previous node version. It does the same check and follows the chain of previous nodes until it finds a node with a timestamp (i.e. node version number) that is less than or equal to the lookup's read version. See the discussion earlier about following a chain of pointers to old nodes. All this may happen before even looking at the node's contents.

When accessing an internal node 102I, the lookup may initially fetch a first portion (e.g. the first 512 bytes) of the node 102, which contains the node header 603 and the shortcut block 604. If node versions are employed and the node version is newer than the read version, the lookup reads the node 102 whose address is stored in the pointer to the previous version of the node (which may be referred to herein as the "old pointer"). The lookup keeps following the chain of old pointers until it reaches a node that belongs to the snapshot it is reading. In embodiments, this node may be searched for the key by inspecting all three blocks 601, 602, 604 in the node. The lookup starts by searching the shortcut block 604 to find the last key that is less than or equal to the target key. It follows the pointer of the shortcut item to find the segment of the large block 601. The search fetches the large segment from memory and searches it to find the last key that is less than or equal to the target key. Next (or in parallel), the lookup fetches the small block 602 from memory and searches it for the last key that is less than or equal to the target key. Items in the small block 602 with a version newer than the lookup's read version are ignored. If back-pointers are used, the lookup follows the pointer stored in the larger of the items 101 found in the small and the large block without comparing the keys—if the back pointer of the small block item points just after the large block item, it follows the pointer in the small block; otherwise, it follows the pointer in the large block. If the target key is smaller than both the first key in the large block and in the small block, the lookup follows the leftmost pointer.

When the lookup reaches the leaf 102I, it searches it in a similar fashion to the internal nodes. The main difference is that it looks for the exact match in the small and the large block, meaning there is no need to order the items in the large and the small block.

Small block search: the search of the small block 602 may start by sorting the items 101 before inspecting them. By sorting, the search of the small block can stop as soon as it encounters the first item with key greater than the target key. In embodiments, the small block sorting does not compare keys. Instead, it uses the order hint field stored in each small block item to establish the ordering. The order hint field stores the item's index in the sorted small block at the time of item's insertion. The indexes are "replayed" while scanning the small block to rebuild the current sorted order. The established order is stored in a temporary indirection array, e.g. in FPGA registers, without copying items. The indirection array is used to access the items in the sorted order. The sorting doesn't introduce significant latency, especially in hardware, and it may be performed in parallel while searching the shortcut block 604 and large block 601. In software, the sorted order may be kept in a small indirection array.

As mentioned earlier, in embodiments, the version number of the small black may be stored as a delta relative to the respective node version number. However this is an optional implementation detail.

Figure 8:
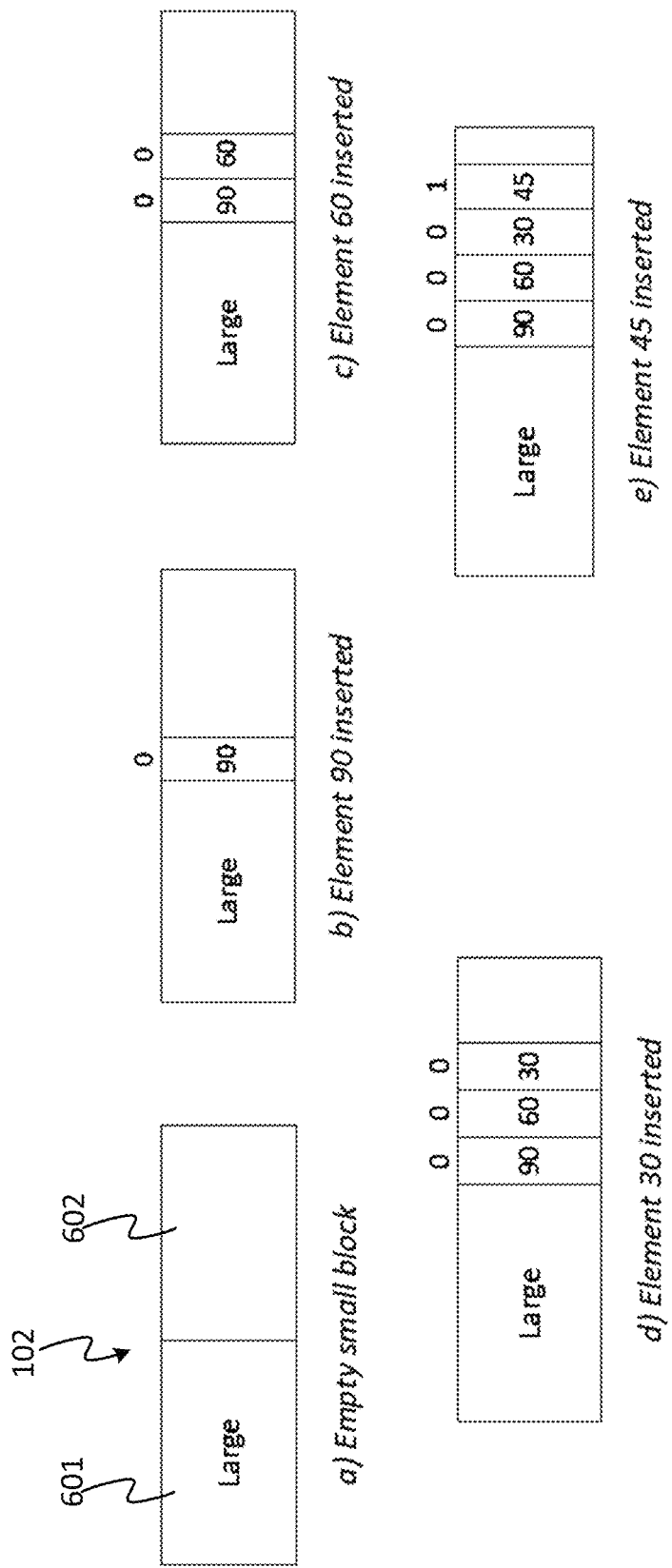
FIG. 8 schematically illustrates a method of including order hints to sort a small block.

FIG. 8 illustrates an example sequence of insertions into a node 102. The number shown in each item 101 represents its key. The elements in the large block 601 are omitted for clarity. The number above the item represents its order hint. At step a) the small block 602 in the node is initially empty. At step b), by way of example, an item with key 90 is inserted and it is assigned order hint 0 as it is the first item in the small block. Next at step c), an item with key 60 is inserted. It is the smallest item in the small block, so it is assigned order hint 0. The order hint in the existing items is not changed. The order hint is determined from the sorted order of the small block, which is established before inserting a new item. Next, at step d), an item with key 30 is inserted. It is again the smallest in the small block, so its order hint is also 0. At step e) the final item's key is 45 and its order hint is 1.

Figure 9:
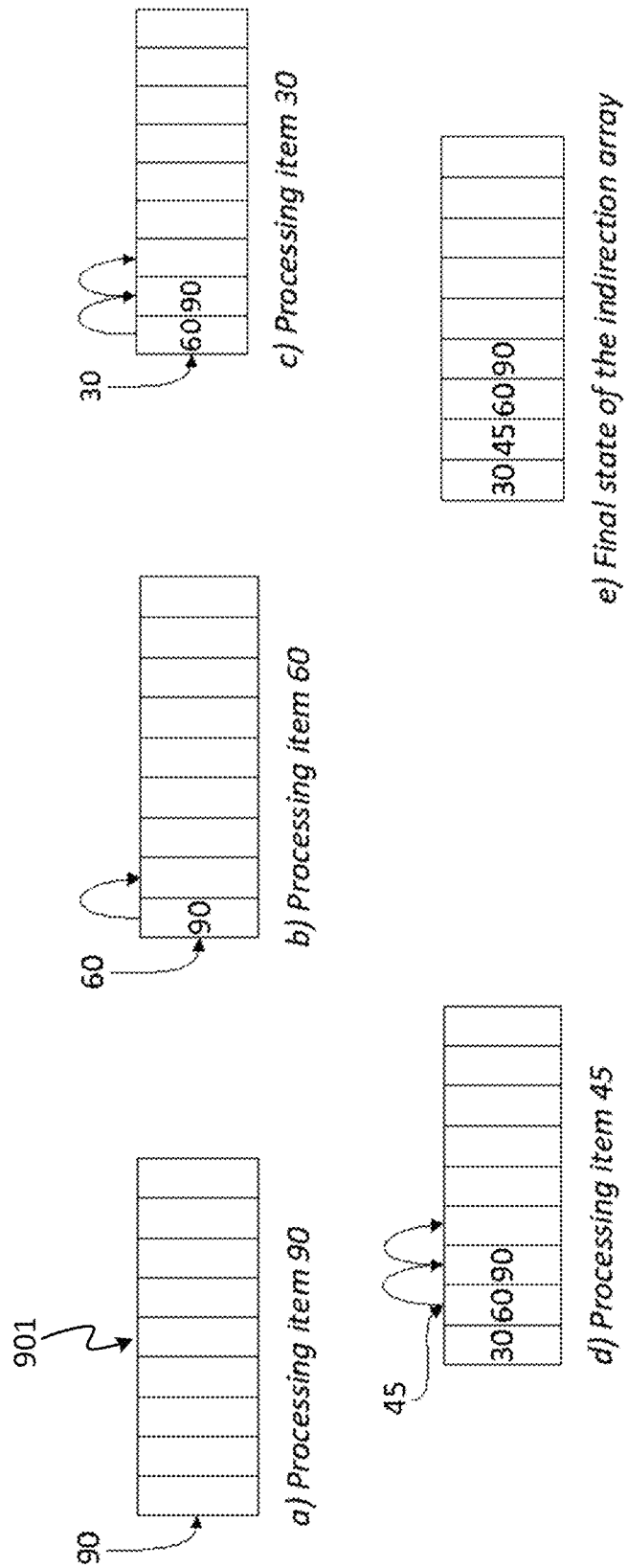
FIG. 9 schematically illustrates a method of sorting a small block based on order hints.

FIG. 9 illustrates the sorting the small block 602. The figure shows the state of the indirection array 901. The indirection array stores offsets of items in the small block, but in the figure each offset is represented by its key for illustrative purposes.

To sort the small block 602, items 101 are processed in the order in which they are stored, and their order hint is used to sort the items in the indirection array. The indirection array 901 stores items' offsets in the small block. When an item with order hint i is processed, its offset in the small block is inserted into position i in the indirection array. All the items at positions j≥i are moved to the right. After the entire small block is processed, the indirection array contains offsets of the items in the sorted order. FIG. 9 illustrates indirection array sorting for the small block shown in FIG. 8. In one implementation each step in the figure completes in a single cycle on the FPGA, in parallel with key comparison. In the first step a), item 90 is inserted into the first slot. In the next step b), all the items are moved to the right and item 60, with order hint 0, is inserted in the first slot. In the next step d), all the items are again moved to the right to make room for item 30 with order hint 0. In the final step d), items 60 and 90 are moved to the right and item 45, with order hint 1, is inserted into the slot with index 1. The final state e) shows the state of the indirection array after steps a)-d).

Figure 10:
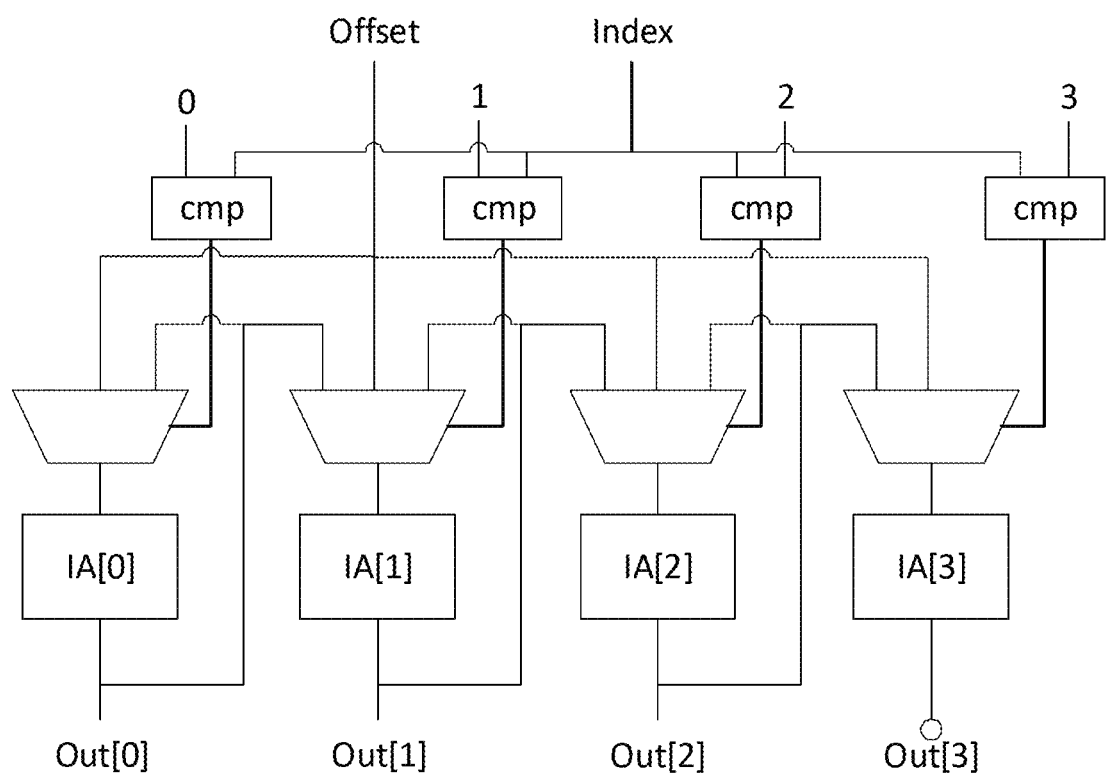
FIG. 10 is a schematic circuit diagram of a four-element small block sorter.

FIG. 10 shows an example implementation of the indirection array sorter. It shows a 4-item wide array. The sorter comprises 9-bit wide registers. The input to a register is either its output, the output of the register to the left of it, or the input offset value. The register input is selected by comparing the input index to the (constant) index of the register. If they are equal, the input offset is selected; if input index is less than the register's index, the output of the register to the left is selected; if input index is greater, the register's output is written to itself. This example implementation does not cover the case of having delete items in the small block, but to accommodate that the input to a register can be adapted so as to also take the output of the register to the right of it.

It will be appreciated of course that the layout shown in FIG. 10 is just one possible hardware implementation and a person skilled in the art may be able to design others using conventional design tools once given the disclosure herein. Also a software implementation on the read side 401 is also possible.

The implementation of sorting on the CPU 401 may follow a similar approach. The indirection array is small, and it comfortably fits into an L1 cache, so the operation is fast. The main difference is that it takes multiple cycles to move the items in the array to the right.

Range Scan

A range scan operation traverses the tree 103 from the root, as described above, to find the start key of the target range. Then it scans forward from the start key, until it reaches the end key of the range or the end of the tree.

If node versions are employed, then when reading a leaf the scan follows the old pointers if necessary, as with the lookup.

In embodiments, to move between leaves 102L, the range scan may use sibling pointers. In such embodiments, each leaf 102L holds a pointer to its left and right siblings, making it possible to perform the range scan in both directions. The use of sibling pointers however is not essential. If sibling pointers are not used, then the scan instead goes back up the tree to find the next leaf. In most cases, it can just look at the first parent and take the next sibling's LID. But if it has gone to the end of the parent, it will go to its parent in order to find its sibling. The scan might have to go up all the way to the root. In further alternative embodiments, all leaves may just have a pointer to the right sibling and not the left. Having just a forward pointer makes sense if only forward scan needs to be supported.

The range scan returns items 101 sorted by their keys. To keep the items sorted, the scan of a leaf 102L may process the large and the small block 601, 602 together. In a covering scan, the scan first finds the item with the highest key that is smaller or equal to the start of the range in both large and small block. A "standard" inclusive scan is similar except it would start from the lowest key that is greater or equal to the start of the range. Either way, the scan then scans the node forward both in the large and the small block looking for the end of the interval and returning items that are in the interval. When an item with a key greater than the right boundary is found in both the large and the small block, the scan stops. While scanning, if both the next small and the next large item are in the interval, the search may decide which to return next using the back pointer in the small item: if the small item points to the large item, the small item is returned and the search moves to the next small item; otherwise, the large item is returned, and the search moves on to the next large item. To handle shortcut keys 604, the scan may keep track of the end of the current large segment. In this case, at the beginning of the next segment, the key is retrieved from the shortcut block and the value from the large block. In the middle of a segment, the key and the value are in the large block.

Insert

An insert operation starts with a tree traversal to find the node 120L in which to insert the new item 101. The traversal is similar to a traversal during the lookup. A difference is that in embodiments it reads all items, regardless of their version, in order to implement the semantics of insert and modify operations. Before updating the node, the writer 401 may lock it with a write lock, ensuring that the state of the node is the one observed during the traversal (note that in embodiments the memory 403 may support different types of lock, write locks and read locks, and the use of a write lock does not necessarily imply the use of a read lock). E.g. the write lock may be stored in a 32-bit lock word in the node's header, wherein the lock word consists of the lock bit and a 31-bit node sequence number, which is incremented when the node gets updated. The writer 401 may acquire the write lock by atomically setting the lock bit using an atomic compare-and-swap instruction on the lock word, while keeping the sequence number the same as during the traversal. If the compare-and-swap succeeds, this means that the node has not changed since the traversal, so the insert can proceed. If the compare-and-swap fails, the node has changed since the traversal, so the writer retries the operation by performing the tree traversal again.

Fast-path insert: in one common case, the insert does not require splitting the node 102L or merging the large and the small block 601, 602. This common-case insert may be performed in place (FIG. 7). The writer 401 atomically appends the new item by first copying it after the end of the small block 602 and then adjusting the size of the small block to include the new item 101. To do this, the writer 401 may perform the following steps after acquiring the write lock: it copies the item to the small block after acquiring the lock; acquires the write version by performing a fetch-and-add on the global write version (thus also atomically updating the global write version); sets the version of the item in the small block; updates the node's size; increments the node's sequence number; unlocks the node; and releases the operation. Optionally the version number in the small block is expressed as a delta relative to the respective node version. In embodiments the lock word and the size of the small block in the header may share the same 64-bit word, so the writer 401 may increment the node version, updates the node's size, and releases the lock with a single instruction. Concurrent readers do not observe the new item while it is being copied, because it is stored beyond the end of the small block as currently specified in the header 603.

They either observe the node without the item or with the item fully written. The readers ignore any item that is not yet released (i.e. before the global read version becomes than greater or equal to the items version), as their version is older than the item.

In embodiments the reader 402 (e.g. FPGA) does not cache leaf nodes 102L. If it did, the writer 401 would have to invalidate the cache 404 by issuing commands over PCIe 405, which would introduce additional overheads to the common case insert.

In embodiments, the system also supports multi-write atomic operations, whereby two or more write operations (to two or more respective keys) are performed by the same, single machine code instruction.

Figure 11:
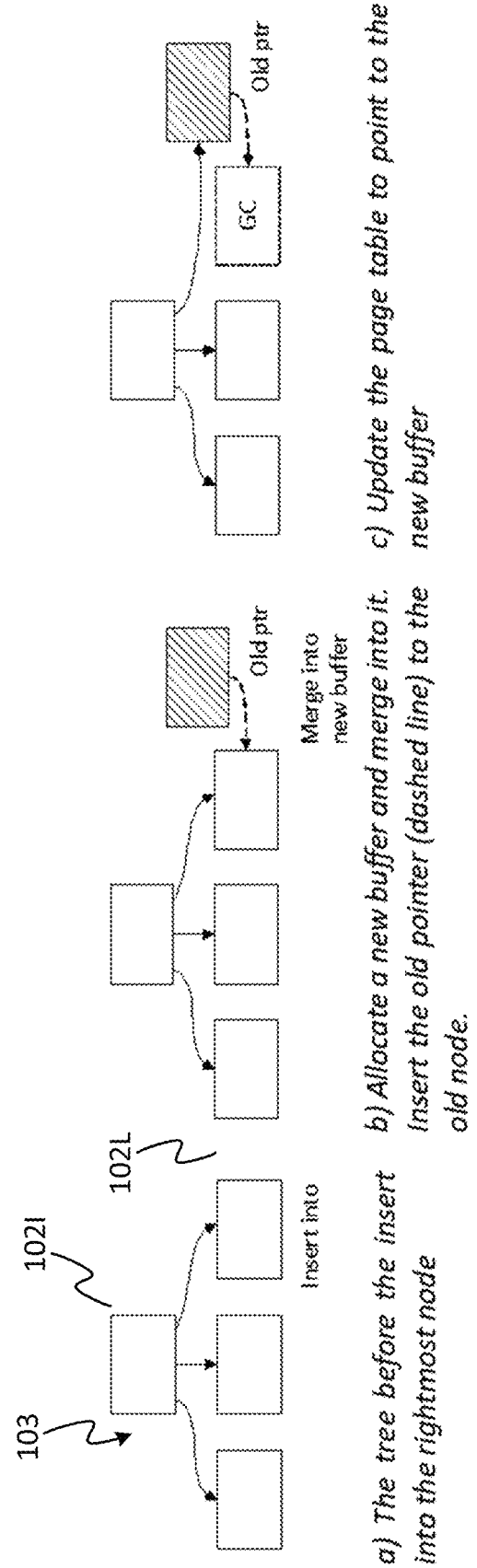
FIG. 11 schematically illustrates a method of merging a large and small block during an insert operation.

Large-small merge: if the small block 602 becomes too large, the writer 401 merges the large and the small block 601, 602 (see FIG. 11). It allocates a new memory buffer for the node 102L and sorts all the items 101 in the node into a large block in the new buffer. In embodiments, the new item is added to the merged large block (rather than a new small block). I.e. the new node's small block is empty after a merge. In principle it could be done the other way (i.e. the new item is the first item added the new small block), but storing the new item in the large block immediately results in slightly fewer large-small merges over time.

In embodiments that use shortcut keys 604, the writer 401 selects the shortcut keys while sorting the items (it selects them at that point as the large block is immutable). For each processed item, the writer 401 decides whether to put it into the shortcut or the large block based on, e.g., the number of bytes copied so far, the remaining bytes to copy, and/or the average size of the key and the value. It preferably maximizes the number of shortcut keys while keeping the large block segments similarly sized.

When all the items are copied in the new buffer, the writer 401 sets the buffer's old pointer to the address of the old buffer, and in embodiments also sets the version of the new buffer to the maximum value (e.g. maximum 64-bit value). The writer 401 then atomically replaces the mapping of the node's LID in the page table 501 with the address of the new buffer. To update the LID mapping, in embodiments the writer 401 updates the LID entry in both the CPU and the FPGA copy of the page table. It acquires a software lock on the LID entry, issues a page table update command to the FPGA, and releases the software lock after the FPGA command is completed. The parent node does not need to be changed because the LID of the node remains the same. In embodiments the page table mappings are not versioned, meaning that concurrent read operations can read the new LID mapping. Those operations still use the old buffer by following the old pointer because their versions are older than the node's version. The writer then acquires the write version and versions the new buffer with it. It releases the updates by signalling to the reader, e.g. using the release ring described in more detail later. After release, the node is visible to new read operations. More specifically, the write operation will increment the global write version and store it in the header of the new node. After the global read version is updated to a version greater or equal to the node's write version, and the write has thus been released, then the write will become visible. In some cases, multiple versions may be released with a single update of the global read version, e.g. by updating it from 5 to 10, not first to 6, then 7, then 8, then 9, and then 10

Finally, the writer puts the old memory buffer into the garbage collection list, unlocks it, and sets the "deleted" flag in its header to ensure that concurrent writers do not update the old buffer. Ongoing operations can still read from the old buffer, but if an operation needs to update a deleted node, it retries. On retry, it will use a new read version and the new node mapping.

The garbage collection used may be any suitable scheme, such as standard explicit garbage collection for concurrent systems, e.g. RCU, epoch-based memory manager, or hazard pointers. FIG. 11 shows an example of the merging of the large and small block during an insert operation. The insert of a new item into a node 102L would cause the small block 602 to exceed its maximum size and so the small block will now be merged into the large block 601, along with the new item. Step a) shows the tree 103 before the insert into the right-most node 102L. Step b) shows the allocation of a new buffer and merging into it. The old pointer (dashed line) to the node is inserted. At step c) the page table is updated to point to the new buffer, and the old buffer is placed into the garbage collection (GC) once it is not needed by any operations in progress.

A benefit of this approach is that complex updates such as merges can be performed without having to place a read lock on the old instance of the node in the original memory address (though some operations may still use write locks, which only prevent multiple writers, but allows one writer and one or more readers to access the node). If the reader 402 tries to read the node 102L while the writer 401 is updating it in the new buffer but before the page table is updated, the reader 402 simply reads the old instance from the existing memory address as currently specified in the page table 501. Once the write to the new buffer (i.e. new memory location) is completed, the writer 401 can then quickly update the page table 501 to switch the respective page-table entry for the node's LID to the new memory address. In embodiments this can be done in a single atomic operation. Any subsequent reads will then read the new instance of the node from the new address based on the updated page table entry. A similar approach can be used for other complex updates such as node splitting or node merging.

When a new memory buffer is allocated for a LID, its sequence number can safely be set to 0 because it is made sure that the buffer is unreachable by any operation before deleting and reusing it. Taking some example sizes by way of illustration, if the large and the small block 601, 602 are merged when the small block becomes bigger than 512 bytes and the size of small block entries is at least 10 bytes (the delete entry size is 10 bytes, the insert entry size is at least 13 bytes), then the maximum version of the buffer is 41, meaning that the 31-bit sequence number never wraps around. In fact in one implementation the smallest size is actually 6 bytes on average, but even with 1-byte entries the sequence number will not overflow.

Node Splitting

Figure 12:
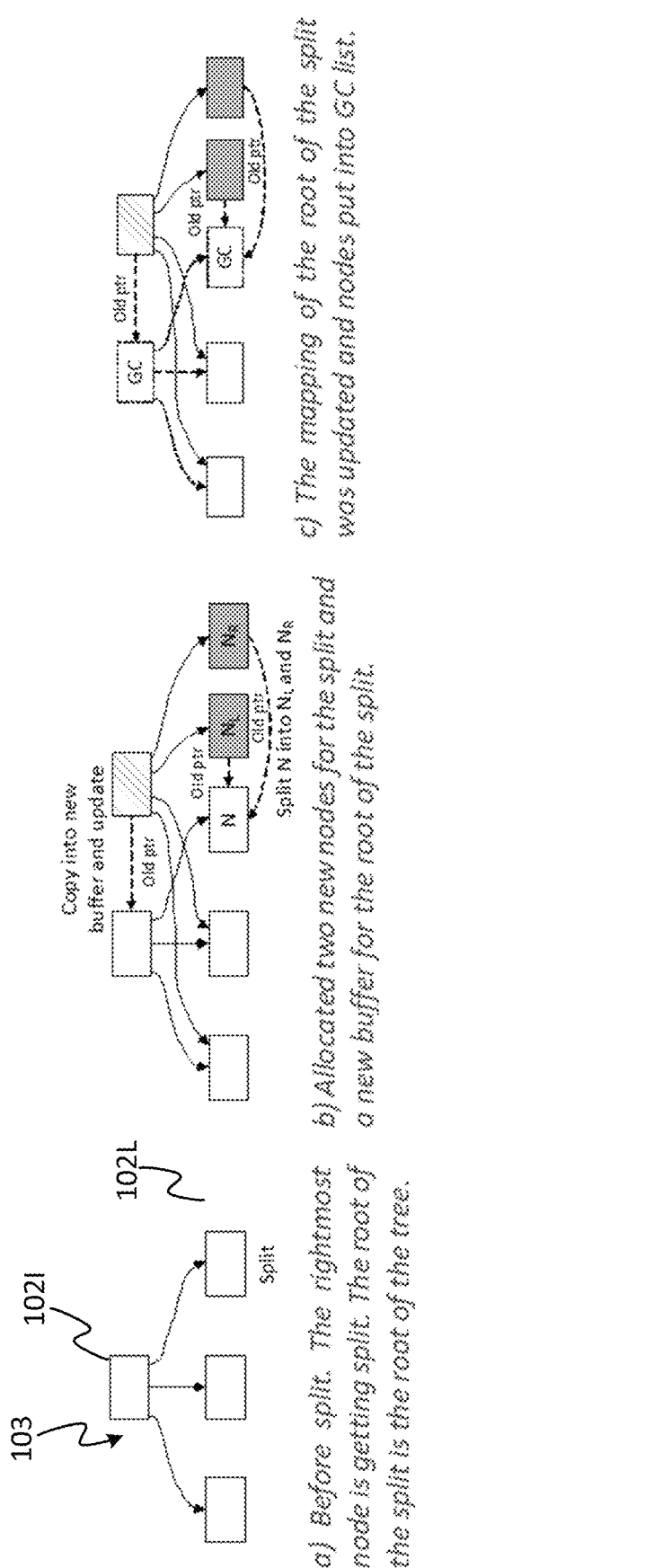
FIG. 12 schematically illustrates a method of splitting a new during an insert.

If there is not enough space in the leaf 102L for the insert, the writer 401 splits the leaf into two, and inserts a pointer to the new item into the parent (FIG. 12). If the parent is full, the writer 401 also splits the parent. The splitting can propagate in this way up to the root. The internal node 102I that is updated, but not split is called the root of the split. The writer replaces the entire subtree below the root of the split by updating the mapping of the root of the split in the page table 501. Before updating any data, the writer may acquire write locks on all nodes 102 that are getting updated by the operation (these are the locks to prevent other writers from interfering). If locking fails because of a node version mismatch, the writer releases all acquired write locks and restarts the operation. The writer also allocates all required memory buffers to complete the operation. It allocates two new nodes (with a new LID and a new buffer) for each node that it splits and a memory buffer for the root of the split. If memory allocation fails because system is out of memory, the writer may give up and returns the appropriate status code to the caller.

After acquiring any locks and allocating memory, the writer processes the nodes from the leaf up, splitting them into newly allocated buffers. Each of the two nodes resulting from the split ends up with roughly half of data from the original node. The writer merges the large and the small blocks while splitting. When it gets to the root of the split, the writer copies it into a new memory buffer. It modifies the new buffer to include pointers to the new child nodes and the key at the boundary between nodes. At this point, the new subtree is complete, but it is not yet visible to the reader 402.

The write operation by the writer 401 starts by versioning the new nodes to "unspecified" first. Then it will set old pointers as already described. Then it updates the page table mapping to change the root of the split. Finally it acquires the write version by updating the global write version and versions all the allocated nodes with it. The writer sets the old pointer of the root of the split to the address of the old buffer of the root of the split. This ensures that the operations with the older version traverse the old subtree. It also sets old pointers of the two new leaves to the address of the leaf that is being split. This ensures that scans which use sibling leaf pointers traverse the old leaf. To swap the two subtrees, the writer updates the mapping of the root of the split in the page table with the address of its new memory buffer. Swapping the subtree in this way ensures that readers either observe the old or the new subtree. The writer then releases the update, e.g. using the release ring, and puts memory buffers of all nodes that got split, their LIDs, and the old memory buffer of the root of the split into the garbage collection list. Finally, it unlocks all memory buffers and marks them deleted.

The new root of the split will point to the old buffer as the old pointer. Also, the two new leaves will point to the leaf that is split as the old pointer.

FIG. 12 shows an example of splitting a node during insert. Dashed boxes represent newly allocated node buffers. Filled boxes represent new nodes with a new LID and a memory buffer. Step a) shows the tree 103 before the split. The rightmost node is getting split. The root of the split is the root of the tree. At step b), two new nodes are allocated for the split, and a new buffer for the root of the split. At step c), the mapping of the root of the split is updated and nodes put into the garbage collection (GC) list.

In embodiments, the writer also updates the sibling leaf pointers, which are used during the scan operation. It locks the sibling leaves and updates the pointers after it swaps in the new subtree. Even though the sibling pointers and the root of the split may not be updated atomically, the readers observe a consistent state of the tree. All the updates performed by the operation are invisible until the updates are released, meaning that a reader will either observe all the updates performed during the split, or none of them. This is a property of an MVCC scheme.

If the root of the tree cannot fit a new item, the writer splits it and creates a new root, increasing the tree height. The writer executes the splits as above, except it allocates a LID and a memory buffer for the new root instead of just the memory buffer for the root of the split. It initializes the new root with the leftmost pointer set to the left half of the old root and a single item that points to the right half of the old root. It may then send a command to the reader (e.g. FPGA) to update the root and the tree height. In one example implementation, the reader 402 records the LID of the root node and the number of tree levels in its local register file, and not in the cache 404. The data copy in the cache, e.g. older root node, will be eventually invalidated when its LID is reused for another physical node, or will be possibly evicted because old data will not be accessed after a short while. So the cache just needs to focus on maintaining the consistency of the cached node data.

Delete

Deleting an item 101 is analogous to inserting a new item. The writer 401 inserts a delete entry into the small block 602. The entry points to the item it is deleting, so the deleted item is ignored during lookup operations. During the merge of the large and the small block 601, 602, the space occupied by deleted items is reclaimed. If a node 102 gets empty, it is deleted. The node deletion can proceed from the leaf 102L up the tree 103 similarly to the node split. In embodiments its atomicity is ensured using the same techniques described above.

Modify

A modify operation may be performed as a combination of an insert and a delete. The writer 401 appends a delete entry for the old item and a new item to the small block 602 and publishes them atomically by updating the node's header 603.

Aside

In the prior, conventional scheme, it would not be desirable to simply have the reader ignore and pass over locked items, as this would create an issue with multi-update operations. To use the running example, say an operation inserts both 30 and 90 (using the same write version). To support multi-update operations, the reader needs to wait to resolve whether an object belongs to its read snapshot (object_ver<=read_ver) or not. If it didn't wait, it could return a result that contains just 30 or just 90 and this is not linearizable. Further, not waiting could cause problems with the tree even without multi-key updates. In embodiments of the presently disclosed tree, a leaf can be reached via two paths: from the root by following the pointers in internal nodes, and from other leaves by following sibling pointers. When a leaf L is split into two, this creates two new leaves L1 and L2, and a new buffer P1 for the parent P. The new leaves L1 and L2 are linked into the linked list formed by leaves using the sibling pointers. After they are linked, L1 and L2 are reachable from other leaves during a scan. L1 and L2 are also set to point to L as their old version to allow read operations that started earlier (and hence have older read version) to read a consistent state of the tree. The mapping of P to P1 is changed. After this, L1 and L2 are also reachable from the root. P1 is set to point to P as its old version to allow older reads to read a consistent state. If using a single version on the other hand, as in the prior scheme, one cannot atomically make visible both paths to L1 and L2 without forcing the reader to wait. A problematic execution would occur when a writer does the split as above but gets delayed just after publishing one of the paths. Note that using the prior scheme of a single global version number, the publication would have to be done by setting the version of L1, L2, and P1. The writer could just be inserting a single item in the tree say 30. This causes L to split. In one variant of the tree, the writer first sets P1's version and only then L1's and L2's versions. The reader searches for 30. It gets the read version equal to the writer's write version, follows the path from the root, and finds 30. The reader then does a scan for range (0,100). Say that keys 0-20 are stored in leaf L0 before L1 and L2 in the leaf linked list. The reader will find L0 by following the pointers from the root. It will then follow a sibling pointer and get to L1. But it will then see that L1 has an undefined version. If it ignores it, it will follow the old pointer, get to L, and continue the scan from there. So it will return a result without 30. This is not linearizable because an operation it performed earlier returned 30. One can construct an analogous execution for the variant in which the writer publishes the paths in the opposite order (we just have the reader first do the scan and then the lookup). This issue could be resolved by only using the path from the root. However this complicates the scan operation somewhat and would result in a more expensive hardware implementation. The scan would need to store the entire path from the root to find the next leaf. It would also be more complex to implement in software, in which case the software would run slower for the scan.

RELEASE RING

To recap, in embodiments each update operation performs the following steps.
1. Execute: perform the traversal, acquire the locks, update the data.
2. Acquire write version: perform fetch-and-add on the global write version.
3. Finish execution: set versions of items and nodes, release the locks.
4. Release the update: wait for operation's turn in the version order, update the global read version.
5. Cleanup: put deleted nodes in garbage collect lists.

The following describes a preferred example of how updates are released, as the release step can incur significant overheads and adversely impact the scalability of the system. The naïve approach of releasing the update is to spin (i.e. wait) on the global read version until it becomes one less than the write version and then update the reader 402 (e.g. FPGA) and the global read version. The naïve approach comes with a certain signalling overhead. For instance, this may have a high cost in certain implementations because of the cost of communication with FPGA over PCIe—e.g. it takes about 1 micro-second to send the version to the FPGA and receive the ack response; meaning the update throughput of the system is limited to 1 M ops/s with the naïve approach.

To amortize the costs of communication with the reader 402 (e.g. FPGA), a release ring data structure may be used to batch the communication to the reader. The release ring is a circular buffer with the number of slots equal to a small power-of-two number (e.g. 128). The write version is used to map the update operation to a slot in the ring by means of a modulo. This may be done based on a least significant portion of the write version (to calculate a modulo of some number n that is a power of two, e.g. 128, one can just take the bottom log_2(n) bits from the number—e.g. 7 bits in case of 128). An operation announces that it is ready to release the update by changing the state of its slot and then checks the state of the first preceding operation. If the preceding operation has not been released yet, the operation leaves it to one of the previous operations to release it, in a batch. If the previous operation has been released, the operation becomes the releaser and scans the ring forward to collect the batch of operations to release. A single write to the reader 402 is required per batch. Note that there could be concurrent write operations running in different threads. If they write different keys in the tree (or more accurately different parts of the tree), they can proceed in parallel.

FIG. 13 shows an example of a release ring with 8 slots and how it is used for batching. By way of illustration the release ring shown in FIG. 13 has 8 slots. FIG. 13*a*) shows slots numbered counter-clockwise. The operation with version 29 maps to slot 5 and with version 30 to slot 6. FIG. 13*b*) shows an example of batching. Operations with version 26, 27, and 28 are all in the release stage and they are released as one batch by 26. Operations 29 and 30 have acquired the write version, but are not ready to be released.

As an example implementation, the slots in the release ring contain a single 64-bit word which stores a 2-bit state of the slot and the top bits of the write version of the last operation that used the slot. The version bits stored in the slot and the slot index form the entire version (e.g., for a ring with 128 slots, we store the top 57 bits in the slots as the bottom 7 bits are determined by the index). Each slot is padded to the full cache line size to avoid false sharing. A slot can be in one of two states: completed and in-progress.

To release its updates, an operation with write version $v_w$ first ensures that its slot is not in use by the previous occupier of the slot, which is the operation with version $v_w$–ringsize. To ensure the slot is available, the operation spins on the global read version until is greater or equal to $v_w$–ringsize, which means that the preceding occupier of the slot has been released. The operation then announces that it is releasing the updates, by storing its version in the slot and setting the state of the slot to completed, with a single write instruction. Once announced, the operation can be released by one of the preceding operations as a part of its release batch. The operation spins on the global read version to determine when it is its turn to release the updates and whether it has been released or not (or alternatively in other implementations of the ring, other versions of the ring, this can be done by checking the preceding slot's version and state). If the global read version becomes equal to $v_w$–1, the operation becomes the releaser. If it becomes greater than or equal to $v_w$, the operation has been released. The release ring supports early return for operations when an operation can determine that it is guaranteed to be released by a preceding operation. To check if it can safely return, the operation checks the state of the preceding slot, just before spinning on the global version. If the preceding operation has not started to release the batch, which is the case if the preceding slot is in completed state or its version is less than $v_w$–1, the operation can return without spinning on the global read version.

To release updates, the operation scans the ring forward to collect a batch of operations to release. It changes the state of each slot in the batch, including its own slot, to in-progress. An operation is included in the batch if its slot is in completed state and the version is one greater than the previous operation in the batch. The scan stops when a slot with a version lower than the preceding operation is encountered. All operations in the batch are released by sending the write version of the last operation in the batch to the reader 402 (e.g. FPGA) and then updating the global read version. Using in-progress state enables early return—if an operation observes that the preceding operation has not moved to the in-progress state, it is guaranteed that the releaser will check its slot and release it eventually.

Early return can improve concurrency in the system as it reduces waiting, but it can weaken consistency guarantees. For instance, if user code inserts a key into the tree 103 and the insert returns early before the operation has been released, a subsequent lookup for the key might not find it in the tree, resulting in non-intuitive behaviour. For this reason, embodiments may not use early return by default, instead leaving the decision on whether to use early return to the user. In this case the user can specify a flag in the API calls to request early return. The user may also be allowed to wait until a previously executed operation that returned early is released. This allows the user code to overlap releasing of updates with code that is not accessing the tree to improve performance.

Alternative release ring schemes: next are described several alternative ring implementations. The authors have experimentally determined that they do not offer performance advantage over the version described above.

Several different release ring schemes with different trade-offs have been considered. The simplest scheme uses only one state: completed. To release its updates, an operation with write version $v_w$ first ensures that its slot is not in use by the previous occupier of the slot, which is the operation with version $v_w$–ringsize. The operation spins on the global read version until is greater or equal to $v_w$–ringsize. Then it sets its version in the slot and spins until the global read version is greater or equal to $v_w$–1. If it becomes greater, that means that the operation has been released by another operation as a part of the batch, so the release is complete. If not, the operation becomes the releaser. It scans the ring forward to collect a batch of operations that are being released. The version stored in a visited slot is compared to the expected releasing version. The expected releasing version is set to $v_w$ and incremented with each new slot visited. The scan stops when it encounters the first slot with an unexpected (old) version. All operations in the batch are released by sending the write version of the last operation in the batch to the reader and then updating the global read version.

This simple scheme requires all operations to read the global read version twice: to determine if the slot is available and to determine when the release is completed. To reduce the contention on the global read version, we introduce another state: released. The releaser moves all slots in the batch into the released state after updating the global read version. It updates slots backwards—from the last operation to the first operation in the batch. To check that its slot is available, an operation with write version $v_w$ ensures that slot's version is equal to $v_w$–ringsize and that the slot is in released state. It does not need to read the global read version. To release the updates, the operation first sets the version of its slot to $v_w$ and state to completed, and then it checks the preceding slot. It waits until the previous slot's version is $v_w$–1 and state is released, or until its version becomes greater than $v_w$. Then it checks the state of its slot. If its slot is still in state completed with version $v_w$, it becomes the new releaser. Otherwise, the operation has been released and it can return to the user.

This scheme supports batching and does not read the global read timestamp, but it does not allow early return of non-releasers. To support early return, the in-progress state may still be used. This state allows an operation to distinguish whether its slot is being read by a releaser or not. If the slot is not being read, the operation can return immediately, as it is guaranteed that one of the older operations will release it. If it is being read, it needs to wait to determine if the releaser will include it in the batch or not. To release a batch of operations, the releaser scans the ring forward, including in the current batch each operation that is in completed state with the expected version. When an operation is included in a batch, its slot is set to in-progress state. After encountering the first operation that cannot be included in the batch, the releaser sends the highest version in the batch to the reader and updates the global read version. It then iterates over all operations in the batch from the last operation to the first and sets their state to released. An operation determines if it should become a releaser in a similar way as before: it checks the state of the preceding slot after setting the version of its own slot and its state to completed. If the preceding slot has the expected version and is in-progress state, the operation waits until the state changes to released or the version changes. It then checks its own slot. If its slot has been released, it returns; otherwise, it becomes a releaser. If the preceding slot is in released state, or the version is higher than the expected version, it checks its own slot to decide if it should become a releaser in the same way. If the preceding slot has the expected version and is in completed state, or it has a version lower than expected, the operation can return immediately—it is guaranteed that a releaser has not yet read its slot and that it will read it in the future.

Note that it is possible to mix and match the above techniques—e.g., one could implement a release mechanism that uses the global read version number to determine whether a slot is available but checks if it has been released only by checking the state of its slot and the preceding slot. An alternative to the schemes above is to use a dedicated releaser thread that collects batches of operations in the ring and releases them.

Multi-Key Updates

The disclosed MVCC synchronization scheme can be extended to support multi-key updates or atomic operations that perform a mix of read and write operations in a straightforward manner. These operations may be referred to herein as transactions. The user code executes transactions in the following manner.
1. The transaction is started explicitly by invoking a start-transaction call. This call creates a transaction descriptor that is passed to all operations executed inside the transaction. The transaction is assigned a read version by reading the global read version.
2. All lookup and scan operations use the transaction's read version instead of acquiring its own. They are executed in the same way as standalone operations, except that they need to deal with read-after-write access by the same transaction. Below is described how read-after-write and write-after-write are handled.
3. An insert, an update, or a delete operation uses the transaction's read version while traversing the tree. It performs all the steps as a standalone operation, including acquiring locks, up to acquiring the write version. The main distinction is that the size of the node is not changed directly. Instead, it is stored in a shadow field in the node's header. This helps handle read-after-write and write-after-write. If the operation cannot acquire a lock because it is held by a different operation, the entire transaction is aborted and retried.
4. When the user code performs all operations inside the transaction, it invokes the transaction commit. The commit operation ensures that the entire transaction is consistent and if so, it atomically publishes all updates made by the transaction.
   a. The transaction first acquires a write version, by atomically incrementing the global timestamp. This version is used to complete all write operations.
   b. The commit then checks that the sequence number of all accessed leaves is unchanged and that they are not locked by a different transaction. If this is not the case, the transaction is aborted. The validation of the read set can be skipped if the desired consistency model is snapshot isolation. If validation is successful, the transaction will commit.
   c. All update operations are completed, similarly to standalone operations. This includes assigning node and small block item versions, setting the node sizes, marking old nodes for deletion, and releasing the locks.
   d. The transaction enters the release ring to release all the updates atomically.
   e. Cleanup is performed, as in standalone operations. This mostly includes storing deleted nodes into the GC list.

Transactions use the same mechanisms as the standalone operations to atomically publish all the updates. No read operation will observe any changes made by the transaction until it is fully released, even after the nodes are unlocked. Transactions also use write locks for synchronizing with write operations and rely on early abort to avoid inconsistencies and deadlocks.

Operations executing as part of a transaction might need to read or write data that has been written by an earlier operation inside the same transaction. This means that the operation will access nodes that have been locked by the same transaction and whose size has been changed. It will also access small block items that have not been assigned a version. To efficiently deal with these read-after-read and read-after-write accesses, we extend the node lock to include the 16-bit thread identifier. Each thread can only execute a single transaction at the time, so the identifier can be used to determine that the node has been locked by the current transaction. When a read encounters a node locked by its transaction, it will access that node without checking the node's version or following the old node pointer. The version of a node created by the transaction is set to the maximum value, so operations not belonging to the same transaction will ignore it and follow the old pointer. The header is also extended to store a shadow node size, which is only used inside a transaction. Write operations executed inside a transaction update the shadow node size and read operations read the shadow node size instead of the common node size. Using the shadow node size allows the operations to read the transaction-local node size efficiently. An alternative would be to store it in a transaction-local table, which would incur higher overheads. Finally, items added to the small block will be assigned the unspecified version number (e.g. 0) during the transaction execution, so the read operations belonging to the same transaction will access the items created in the same transaction.

When a transaction aborts, it will roll back all the changes performed so far. This includes rolling back the changes to the page table, freeing all newly allocated nodes, and unlocking all nodes that have been locked for writing.

CONCLUSION

It will be appreciated that the above embodiments have been described by way of example only. More generally, according to one aspect disclosed herein there is provided a system comprising: memory storing a data structure comprising a plurality of items, each item comprising a key-value pair; a writer arranged to perform a plurality of write operations each to write a respective item, either a new item being added to the data structure or an existing item being modified in the data structure; and a reader configured to perform a group-read operation to read from the data structure any items having keys in a specified range; wherein the writer is configured to maintain a global write version and the reader is configured to maintain a global read version; wherein the writer is configured to perform each of the write operations by: i) reading and then incrementing the global write version, ii) writing the respective item in the data structure, including versioning the respective item with a respective version number equal to the global write version as read by the respective write operation prior to the increment, and then iii) generating a release indicator indicating the respective version number; wherein the writer is configured to send release signals corresponding to at least some of the release indicators to the reader, each release signal signalling the respective version number, but to refrain from sending release signals corresponding to any release indicator indicating a higher respective version number before the release indicators indicating all lower version numbers have been generated; wherein the reader is configured so as, upon receiving each release signal sent by the writer, to update the global read version to be equal to the respective version number as signalled in the release signal; and wherein the reader is configured to perform the group-read operation by: reading the global read version at the start of the group-read operation, and then selectively reading items from the specified range of keys in the data structure based on having version numbers equal to or less than the global read version as read at the start of the group-read operation, passing over items in the specified range that have a greater version number.

In embodiments, the writer may be configured to perform at least two of said write operations within a same atomic operation.

In embodiments, the system may comprise a bus connecting the writer and reader, and the writer may be configured to perform said sending of the release signals to the reader over the bus.

In embodiments, the writer may be implemented in software stored in computer-readable storage of the system and arranged to run on one or more processors of the system.

In embodiments, the reader may be implemented in a PGA, FPGA or dedicated hardware circuitry.

In embodiments, the group-read may be a range scan which scans through the specified range in order of key.

In embodiments, the data structure may comprise a tree structure which comprises a plurality of nodes each having a node ID, with some nodes being leaf nodes and others internal nodes wherein each internal node is a parent of a respective set of one or more children in the tree structure, each child being either a leaf node or another internal node, and each leaf node being a child but not a parent, and wherein each of the leaf nodes comprises a respective set of one or more of the items, and each of the internal nodes maps the node ID of each of its respective children to a range of keys encompassed by the respective child. The writer may be configured so as, when performing each of the write operations, to identify which leaf node to write to by following the mapping of keys to node IDs through the tree structure. The reader may be configured so as, when performing the group-read operation, to determine which leaf node or nodes to read from by following the mapping of keys to node IDs through the tree structure to at least one of the leaf nodes.

In embodiments, each leaf node may further indicate the node IDs of one or more sibling leaf nodes that encompass a range of keys neighbouring the keys of the respective leaf node. The reader is configured so as if the range scan reads from a range of items spanning more than one leaf node, to: determine one of the leaf nodes encompassing one of the keys in the scanned range by following the mapping of keys to node IDs through the tree structure, then determine at least one other leaf node encompassing at least one other key in the scanned range by using the ID of at least one of the sibling leaf nodes as indicated in said one of the leaf nodes.

In embodiments, each of the leaf nodes may comprise a respective first block and a respective second block, the first block comprising a plurality of the items of the respective leaf node sorted in an address space of the memory in order of key. The writer may be configured so as, when performing each of the write operations, to write the respective new or modified item to the second block of the identified leaf node in an order in which written, rather than sorted in order of key.

The reader may be configured so as, when performing the group-read operation, to search each determined leaf node for items in the specified range based on a) the order of the items as already sorted in the respective first block and b) the reader sorting the items of the respective second block by key relative to the items of the respective first block. Said passed-over items may be at least the items in the respective small block that have version number greater than the global read version as read at the start of the group-read operation.

In embodiments, the writer may be operable to perform a small-large block merge operation on each of at least some of the leaf nodes, wherein the small-large merge operation reads and then increments the global write version, merges the respective second block with the respective first block, and versions the node with a node version equal to the global write version as read by the small-large merge operation prior to the increment. In each leaf node whose first and second blocks have been merged, the node may also store a pointer to a copy of a previous version of the node from before the merge. The reader may be configured so as, when performing the group-read operation, then in each determined leaf node, if encountering in the respective first block any items in the specified range that have a respective version number greater than the global read version as read at the start of the group-read operation, to follow the pointer to the previous version of the node and attempt to read these items from the previous version.t In embodiments, each second block may have a maximum size. The writer may be configured to perform the small-large merge operation on a leaf node if writing an item to the leaf node that would cause the respective second block of the identified node to exceed the maximum size.

In embodiments, the writer may be configured so as not to send a release signal corresponding to every one of the release indicators to the reader, but instead to send, one after another, at least some release signals corresponding to release indicators with discontiguous version numbers, so as to batch together the release of some of the items.

In embodiments, the writer may comprise a plurality of concurrent threads, and at least some of the write operations are performed by different ones of the threads. The system may comprise a circular buffer comprising N slots having index i=0 . . . N−1. Each write operation may place its release indicator in a slot i_r in a circular buffer with N slots, where i_r=v mod N, where v is the respective version number. The writer may be configured to so as when a write operation places a respective release indicator in the circular buffer, to check whether the slot with the immediately preceding index contains the release indicator indicating the next lowest version number, and if not, leave the respective release indicator in the circular buffer to allow the respective item to be released by another write operation, but if so, determine a batch of release indicators comprising the respective release indicator and any release indicators occupying contiguous slots immediately forward of the respective release indicator indicating a contiguous run of version numbers, and send to the reader a single release signal signalling the greatest version number in the determined run, causing the reader to update the global read version to this version number, thereby releasing a batch of items corresponding to the batch of release indicators.

According to further aspects disclosed herein, there may be provided a method and/or computer program for performing the operations of the writer and/or reader, or whole system, as disclosed in any embodiment herein.

Other variants or applications of the disclosed techniques may become apparent to a person skilled in the art once given the disclosure herein. The scope of the present disclosure is not limited by the described embodiments but only by the accompanying claims.

The invention claimed is:

1. A system comprising:
memory storing a data structure comprising a plurality of items, each item comprising a key-value pair;
a writer arranged to perform a plurality of write operations each to write a respective item, either a new item being added to the data structure or an existing item being modified in the data structure; and
a reader configured to perform a group-read operation to read from the data structure any items having keys in a specified range;
wherein the writer is configured to maintain a global write version and the reader is configured to maintain a global read version;
the writer is configured to perform each of the write operations by: i) reading and then incrementing the global write version, ii) writing the respective item in the data structure, including versioning the respective item with a respective version number equal to the global write version as read by the respective write operation prior to the increment, and then iii) generating a release indicator indicating the respective version number;
the writer is configured to send release signals corresponding to at least some of the release indicators to the reader, each release signal signalling the respective version number, but to refrain from sending release signals corresponding to any release indicator indicating a higher respective version number before the release indicators indicating all lower version numbers have been generated;
the reader is configured so as, upon receiving each release signal sent by the writer, to update the global read version to be equal to the respective version number as signalled in the release signal; and
the reader is configured to perform the group-read operation by: reading the global read version at the start of the group-read operation, and then selectively reading items from the specified range of keys in the data structure based on having version numbers equal to or less than the global read version as read at the start of the group-read operation, passing over items in the specified range that have a greater version number.

2. The system of claim 1, wherein the writer is configured to perform at least two of said write operations within a same atomic operation.

3. The system of claim 1, wherein the system comprises a bus connecting the writer and reader, and the writer is configured to perform said sending of the release signals to the reader over the bus.

4. The system of claim 1, wherein the writer is implemented in software stored in computer-readable storage of the system and arranged to run on one or more processors of the system.

5. The system of claim 1, wherein the reader is implemented in a PGA, FPGA or dedicated hardware circuitry.

6. The system of claim 1, wherein the group-read is a range scan which scans through the specified range in order of key.

7. The system of claim 1, wherein:
the data structure comprises a tree structure which comprises a plurality of nodes each having a node ID, with some nodes being leaf nodes and others internal nodes wherein each internal node is a parent of a respective set of one or more children in the tree structure, each child being either a leaf node or another internal node, and each leaf node being a child but not a parent, and wherein each of the leaf nodes comprises a respective set of one or more of the items, and each of the internal nodes maps the node ID of each of its respective children to a range of keys encompassed by the respective child;
the writer is configured so as, when performing each of the write operations, to identify which leaf node to write to by following the mapping of keys to node IDs through the tree structure; and
the reader is configured so as, when performing the group-read operation, to determine which leaf node or nodes to read from by following the mapping of keys to node IDs through the tree structure to at least one of the leaf nodes.

8. The system of claim 6, wherein the group-read is a range scan which scans through the specified range in order of key, and wherein:
each leaf node further indicates the node IDs of one or more sibling leaf nodes that encompass a range of keys neighbouring the keys of the respective leaf node; and
the reader is configured so as if the range scan reads from a range of items spanning more than one leaf node, to:
determine one of the leaf nodes encompassing one of the keys in the scanned range by following the mapping of keys to node IDs through the tree structure, then
determine at least one other leaf node encompassing at least one other key in the scanned range by using the ID of at least one of the sibling leaf nodes as indicated in said one of the leaf nodes.

9. The system of claim 7, wherein:
each of the leaf nodes comprises a respective first block and a respective second block, the first block comprising a plurality of the items of the respective leaf node sorted in an address space of the memory in order of key;
the writer is configured so as, when performing each of the write operations, to write the respective new or modified item to the second block of the identified leaf node in an order in which written, rather than sorted in order of key; and
the reader is configured so as, when performing the group-read operation, to search each determined leaf node for items in the specified range based on a) the order of the items as already sorted in the respective first block and b) the reader sorting the items of the respective second block by key relative to the items of the respective first block;
said passed-over items being at least the items in the respective small block that have version number greater than the global read version as read at the start of the group-read operation.

10. The system of claim 9, wherein:
the writer is operable to perform a small-large block merge operation on each of at least some of the leaf nodes, wherein the small-large merge operation reads and then increments the global write version, merges the respective second block with the respective first block, and versions the node with a node version equal to the global write version as read by the small-large merge operation prior to the increment;

in each leaf node whose first and second blocks have been merged, the node also stores a pointer to a copy of a previous version of the node from before the merge;

the reader is configured so as, when performing the group-read operation, then in each determined leaf node, if encountering in the respective first block any items in the specified range that have a respective version number greater than the global read version as read at the start of the group-read operation, to follow the pointer to the previous version of the node and attempt to read these items from the previous version.

11. The system of claim 10, wherein:
each second block has a maximum size; and
the writer is configured to perform the small-large merge operation on a leaf node if writing an item to the leaf node that would cause the respective second block of the identified node to exceed the maximum size.

12. The system of claim 1, wherein the writer is configured so as not to send a release signal corresponding to every one of the release indicators to the reader, but instead to send, one after another, at least some release signals corresponding to release indicators with discontiguous version numbers, so as to batch together the release of some of the items.

13. The system of claim 1, wherein:
the writer comprises a plurality of concurrent threads, and at least some of the write operations are performed by different ones of the threads;
the system comprises a circular buffer comprising N slots having index $i=0 \ldots N-1$;
each write operation places its release indicator in a slot $i\_r$ in a circular buffer with N slots, where $i\_r=v \bmod N$, where v is the respective version number;
the writer is configured to so as when a write operation places a respective release indicator in the circular buffer, to check whether the slot with the immediately preceding index contains the release indicator indicating the next lowest version number, and
  if not, leave the respective release indicator in the circular buffer to allow the respective item to be released by another write operation, but
  if so, determine a batch of release indicators comprising the respective release indicator and any release indicators occupying contiguous slots immediately forward of the respective release indicator indicating a contiguous run of version numbers, and send to the reader a single release signal signalling the greatest version number in the determined run, causing the reader to update the global read version to this version number, thereby releasing a batch of items corresponding to the batch of release indicators.

14. A method comprising:
storing a data structure comprising a plurality of items, each item comprising a key-value pair;
by a writer, performing a plurality of write operations each to write a respective item, either a new item being added to the data structure or an existing item being modified in the data structure; and
by a reader, performing a group-read operation to read from the data structure any items having keys in a specified range;
wherein the writer maintains a global write version and the reader maintains a global read version;
wherein each of the write operations comprises: i) reading and then incrementing the global write version, ii) writing the respective item in the data structure, including versioning the respective item with a respective version number equal to the global write version as read by the respective write operation prior to the increment, and then iii) generating a release indicator indicating the respective version number;
wherein the method comprises the writer sending release signals corresponding to at least some of the release indicators to the reader, each release signal signalling the respective version number, but refraining from sending release signals corresponding to any release indicator indicating a higher respective version number before the release indicators indicating all lower version numbers have been generated;
wherein the reader, upon receiving each release signal sent by the writer, updates the global read version to be equal to the respective version number as signalled in the release signal; and
wherein the group-read operation comprises: reading the global read version at the start of the group-read operation, and then selectively reading items from the specified range of keys in the data structure based on having version numbers equal to or less than the global read version as read at the start of the group-read operation, passing over items in the specified range that have a greater version number.

15. A computer program embodied on computer-readable storage, the program comprising code configured so as when run on one or more processors to perform the operations of:
storing a data structure comprising a plurality of items, each item comprising a key-value pair;
by a writer, performing a plurality of write operations each to write a respective item, either a new item being added to the data structure or an existing item being modified in the data structure; and
by a reader, performing a group-read operation to read from the data structure any items having keys in a specified range;
wherein the writer maintains a global write version and the reader maintains a global read version;
wherein each of the write operations comprises: i) reading and then incrementing the global write version, ii) writing the respective item in the data structure, including versioning the respective item with a respective version number equal to the global write version as read by the respective write operation prior to the increment, and then iii) generating a release indicator indicating the respective version number;
wherein the method comprises the writer sending release signals corresponding to at least some of the release indicators to the reader, each release signal signalling the respective version number, but refraining from sending release signals corresponding to any release indicator indicating a higher respective version number before the release indicators indicating all lower version numbers have been generated;
wherein the reader, upon receiving each release signal sent by the writer, updates the global read version to be equal to the respective version number as signalled in the release signal; and
wherein the group-read operation comprises: reading the global read version at the start of the group-read operation, and then selectively reading items from the specified range of keys in the data structure based on having version numbers equal to or less than the global read version as read at the start of the group-read operation, passing over items in the specified range that have a greater version number.

\* \* \* \* \*